(12) United States Patent
Rokicki

(10) Patent No.: US 6,347,318 B1
(45) Date of Patent: Feb. 12, 2002

(54) METHOD, SYSTEM, AND APPARATUS TO IMPROVE PERFORMANCE OF TREE-BASED DATA STRUCTURES IN COMPUTER PROGRAMS

(75) Inventor: Tomas Rokicki, Palo Alto, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/387,866

(22) Filed: Sep. 1, 1999

(51) Int. Cl.[7] .............................................. G06F 17/30
(52) U.S. Cl. ....................... 707/100; 707/101; 707/102; 707/103; 707/104
(58) Field of Search ................................. 707/100, 101, 707/102, 103, 104

(56) References Cited

U.S. PATENT DOCUMENTS

| | | | | |
|---|---|---|---|---|
| 5,179,702 A | * | 1/1993 | Spix et al. ................... | 395/650 |
| 5,347,632 A | * | 9/1994 | Filepp et al. ................ | 395/200 |
| 5,524,244 A | * | 6/1996 | Robinson et al. ........... | 395/700 |
| 5,590,345 A | * | 12/1996 | Barker et al. ................ | 395/800 |
| 5,594,910 A | * | 1/1997 | Filepp et al. ................ | 395/800 |
| 5,758,072 A | * | 5/1998 | Filepp et al. ............. | 395/200.5 |
| 5,842,031 A | * | 11/1998 | Barker et al. ................ | 395/800 |
| 6,171,109 B1 | * | 1/2001 | Ohsuga ....................... | 434/118 |
| 6,182,123 B1 | * | 1/2001 | Filepp et al. ................ | 709/217 |
| 6,195,676 B1 | * | 2/2001 | Spix et al. ................... | 709/107 |
| 6,199,100 B1 | * | 3/2001 | Filepp et al. ................ | 709/203 |
| 6,275,852 B1 | * | 8/2001 | Filepp et al. ................ | 709/220 |

OTHER PUBLICATIONS

R. Seidel et al., "Randomized Search Trees", Algorithmica, (1996) 16:464–497.
Thomas H. Cormen, et al., "Introduction to Algorithms", pp. 244–262, plus cover sheets (2).
"Learn Boolean Algebra" (visited Jul. 23, 1999) www.rt-–sys.com/bool.htm>.
"Dictionary.com/two's complement" (visited Aug. 17, 1999) www.dictionary.com/cgi–bin/dict.pl?term=two %27s +complement&x=12&y =11 >.

* cited by examiner

*Primary Examiner*—Frantz Coby

(57) ABSTRACT

A method, system, and apparatus for improving performance of a program executing on a computer system. More particularly the present invention improves the balance determined by an ordering of information stored in a tree-based data structure on a computer thereby reducing the time required to search, update, or perform other common operations on the tree-based data structure.

20 Claims, 10 Drawing Sheets

METHOD, SYSTEM, AND APPARATUS TO IMPROVE PERFORMANCE OF TREE-BASED DATA STRUCTURES IN COMPUTER PROGRAMS

FIELD OF THE INVENTION

The present invention relates generally to a method, system, and apparatus for improving performance of a program executing on a computer system. More particularly the present invention improves the balance determined by an ordering of information stored in a tree-based data structure on a computer and thereby reduces the time required to search, update, or perform other common operations on the tree-based data structure on a computer system.

BACKGROUND OF THE INVENTION

Typically a tree-based data structure is used to store information in a computer system. It will be appreciated that the term "tree-based data structure" as used herein represents connected information that includes "nodes" that are individual units of information and that include at least one value. Further, the connection of the nodes may represent a hierarchy in which the value of a node may be equal to, greater than, or less than another node. One implementation of a tree-based data structure, typically called a Binary Tree, represents the descendant nodes of a parent node having a value that is less than or equal to the parent node as left nodes, and the descendant nodes having a value greater than the parent node as right nodes. One form of the Binary Tree, typically called a Cartesian Tree, represents the descendant nodes of a parent node being associated with a second value less than or equal to the second value associated with the parent node. The terms "tree" and "tree-based data structure" will be used interchangeably herein.

Inserting a new node into an existing tree-based data structure may include the following operations. Initially, a search is conducted starting at the initial, or root, node and traversing down the tree until the correct position for insertion is located. At each node a direction, or branch, is followed depending on whether the new node value is equal to, less than, or greater than the existing node value. Then a proper location for insertion is determined based on the properties of the tree, such as the properties of a Binary Tree or a Cartesian Tree, and the relationship of the two nodes.

A problem with trees of the past, such as Binary Trees, is that nodes associated with equivalent values have not been specially handled by operations that manage a tree. It will be appreciated that the information stored in the tree-based data structure may be catalogued by reference to a value, typically called a key, and the key may be identical to other keys associated with the tree-based data structure. Therefore, since the operation of inserting a node in a tree proceeds to the same branch when the value associated with the new node is equal to the value associated with an existing node, the insertion of many new nodes will be on the same branch thereby leading to an imbalanced tree. It will be appreciated that an imbalanced tree has a preponderance of the nodes placed on the same branch of the tree.

Another problem with trees of the past, such as Cartesian Trees, occurs when the values associated with the nodes in a tree progress in a patterned order, since the related information in the tree will be imbalanced. For instance, when the values associated with the nodes progress sequentially, the representative node will generally be placed on the same branch of the tree as the previous node thus creating an imbalanced tree.

An important characteristic of a tree is that it enables quick searches of the nodes on the tree. Therefore, if the tree is imbalanced the tree may be considered a degenerate tree. The degenerate tree is characterized by a long search path, similar to a linked list, and information is reached by traversal of the nodes via the long search path. Those skilled in the art will appreciate the use of a linked list.

The operations of the past that operate to manage a tree by compact solutions do not efficiently manage the occurrence of equal keys that are associated with nodes or the occurrence of keys that are associated with nodes in a patterned order. Therefore, the resulting tree is degenerate and does not enable quick searching, updating, or performing other related operations on the tree. Also operations of the past may efficiently balance a tree but require expensive inefficient solutions to manage the tree.

SUMMARY OF THE INVENTION

The present invention is a method, system, and apparatus for improving performance of a program executing on a computer system. More particularly the present invention improves the balance determined by an ordering of information stored in a tree-based data structure on a computer by a compact solution thereby reducing the time required to search, update, or perform other common operations on the tree-based data structure.

The present invention specially handles operations that manage a tree to ensure that the tree is balanced. More particularly, when the key associated with a new node is equal to the key associated with another node in the tree, the present invention manages the operation of inserting the new node in a tree such that the tree is balanced. Further, when the values associated with the nodes in a tree progress in a patterned order, the present invention specially handles operations that manage a tree to ensure that the nodes in the tree are balanced.

The present invention novelly manages the operations of inserting a node in a tree by specially handling nodes with associated keys that are equal or nodes with associated keys that progress in a pattern. Thereby, the present invention reduces the occurrence of a degenerate tree during the operation of inserting nodes in a tree over tree-related operations in the past, and enables quick searching, updating, or other related operations on the tree. It will be appreciated that patterns associated with keys, such as sequentially progressing keys, may cause a degenerate tree.

The present invention novelly and efficiently compares at least two computer-based values by determining a bit reversal order value of a first value and a second value. The computer system includes computer readable medium that is encoded in a source program that executes on the computer system. Also, the computer system supports two's complement execution of the source program, a logical XOR operation, and a logical AND operation, subtraction, and negation.

In one embodiment of the present invention a third value is assigned the result of executing logical XOR on the first value and the second value. Further, a fourth value is assigned the result of executing negation on the third value. In an alternative embodiment the third value is assigned the result of subtracting the second value from the first value; and the fourth value is assigned the result of subtracting the first value from the second value.

Then in either embodiment of the present invention, a fifth value is assigned a result of executing logical AND on the third value and the fourth value. Further, a bit reversal order value is assigned the result of executing logical AND on the fifth value and the second value, and if the bit reversal order value is not zero then the reverse of the second value is greater than the reverse of the first value thereby ordering the first value and the second value.

Accordingly, it is an object of the invention to balance the placement of nodes on a tree when the keys associated with the nodes are equal or when the keys associated with the nodes progress in a pattern. More particularly the present invention introduces a tie-breaking operation during the insertion of a node in a tree. The tie-breaking operation may be based on information that is associated with the node or associated with the location of the node.

Also, it is an object of the invention to improve the efficiency of searching, updating, and other associated operations of a node in a tree by using a bit reversal value or bit reversed address associated with the node to balance the tree. Typically, computer-based information is represented by bits in a computer system. A bit is a basic unit used to store information in a computer system. Therefore "bit reversal" refers to reversing each representative bit of a value so that the least significant bit becomes the most significant bit, the next-least significant bit becomes the next-most significant bit, and so on.

The bit reversal operation of the present invention advantageously uses the least significant bits of values associated with nodes in a tree. The least significant bits typically vary more than the most significant bits of values such as keys that may be associated with computer-based addresses. Therefore, the present invention introduces jitter into the values that are associated with nodes of a tree by a bit reversal operation that uses the least significant bits of the values. Thereby the present invention balances the nodes of a tree more efficiently than in the past. The term "jitter" refers herein to an irregular order of values as compared to a patterned order of values, that is used by the present invention to balance the values associated with nodes of a computer-based tree.

It is also an object of the invention to reduce the resources required to insert a node or to search for a node in a well-balanced tree by applying a bit-reversal operation to information associated with the node or the location of the node. More particularly, use of the bit reversal operation does not require the allocation of computer-based storage associated with each node and may be completed by operations in the computer registers during execution.

By means of example the present invention may be used to balance a degenerate Binary Tree by associating a second value with each node and organizing the tree as a Cartesian Tree. Further, the second value is the result of a bit-reversal operation of the present invention and introduces balance to an otherwise degenerate Binary Tree.

Another example of the use of the present invention associates a bit reversal order value with the result of the bit reversal operation that is applied to values associated with nodes of a tree thereby balancing a tree. A bit reversal value may be derived from the address of each node or the value associated with each node. Further the bit reversal value may be concatenated with the values associated with each node. Therefore an example of the use of the present invention operates as a tie-breaker by associating a bit reversal order value with nodes in a tree having a preponderance of nodes with equivalent values. Operating as a tie-breaker improves the balance of the tree by eliminating degeneracy caused by nodes having equivalent values.

By means of example of the use of a tree, an operating system (O.S.) typically includes information about computer-based resources used during the execution of instructions on a computer system. The information is often created in the form of a tree-based data structure. Therefore, the efficiency of execution of instructions on the computer system will be impacted by the efficiency of the allocation and use of the resources associated with the execution of the instruction. Further, the efficiency of searching, updating, or performing other computer-based operations on a tree-based data structure associated with the resources, will therefore impact the efficiency of the allocation and use of the resources, such as the execution of the instructions. The present invention creates a tree-based data structure with greater balance than in the past and thereby improves the efficiency of searching, updating, or performing other related operations on the tree-based data structure over past tree-based data structures.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1A:
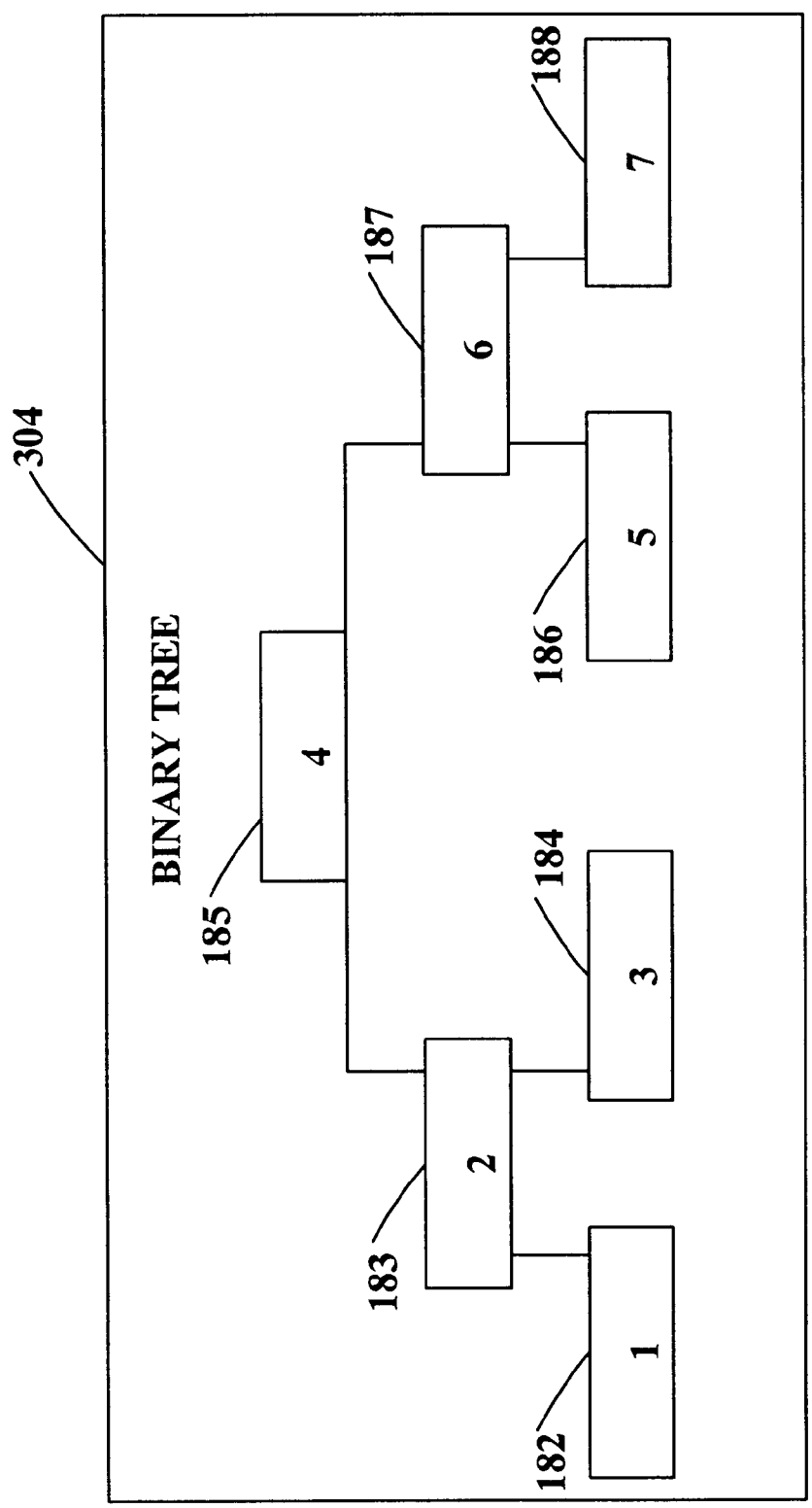
FIG. 1A is a block diagram that illustrates a Binary Tree.

In the following detailed description and in the several figures of the drawings, like elements are identified with like reference numerals.

Figure 3:
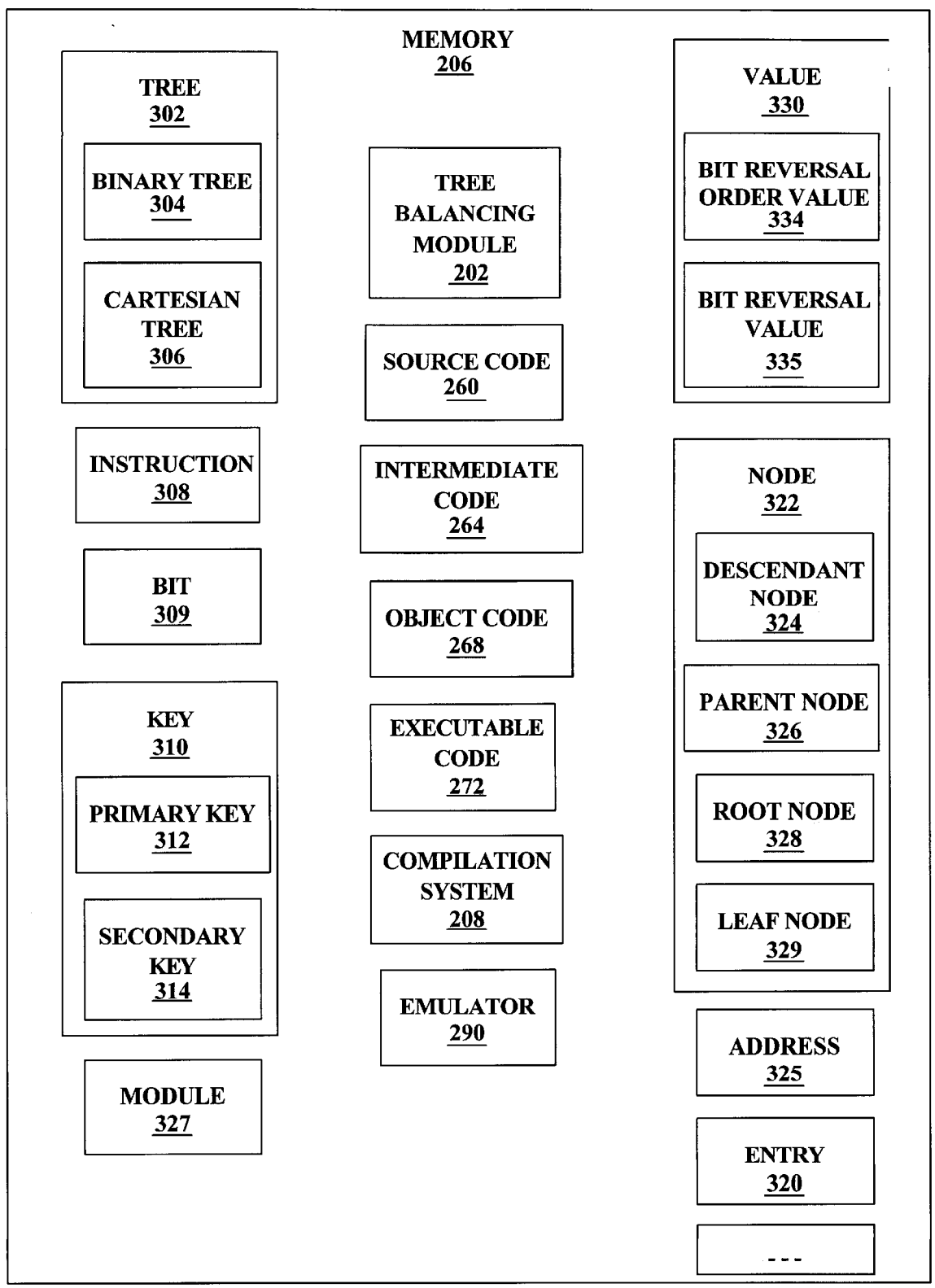
FIG. 3 is a block diagram that illustrates the memory including data structures and functions of the computer system and those used by the tree balancing module.

Broadly stated, FIG. 1A illustrates a typical Binary Tree 304. The root node 328 of a tree 302 typically has descendant nodes 324 but does not have a parent node 326 (as are shown in FIG. 3). Further, the root node 328 of a tree 302 is the only node 322 that does not have a parent node 326. A leaf node 329 (as shown in FIG. 3) of a tree 302 is a node 322 that does not have associated descendant nodes 324.

The Binary Tree 304 supports an in-order traversal of the nodes 322 of the Binary Tree 304. It will be appreciated that the term "in-order" as used herein refers to the placement of nodes 322 in a tree 302 such that the descendant node 324 of a parent node 326 associated with a key 310 (as shown in FIG. 3) that is less than or equal to the key 310 associated with the parent node 326 is placed to the left of the parent node 326; and the descendant node 324 associated with a key 310 that is greater than or equal to the key 310 associated with a parent node 326 is placed to the right of the parent node 326.

It will be appreciated that the position in the ordering of the nodes may be reversed and therefore the references to "left" herein may be transferred to references to "right." Also the references to "right" herein may be transferred to "left." The references may also be made to a "first" position and a "second" position. Therefore, the positions have been described herein with reference to "left" and "right" for purposes of explanation and to avoid unnecessary distraction from the underlying invention.

Information that is referenced in the Binary Tree 304 typically may be located by searching the keys 310 associated with the nodes 322 of the Binary Tree 304. The order of searching a Binary Tree 304, as shown in FIG. 1A may start with the root node 328 associated with the key 310 labeled "4" as shown in element 185. The root node 328 is a parent node 326 to all the nodes 322 in the Binary Tree 304 and has no associated parent node 326.

Next, if the value 330 (as shown in FIG. 3) of the search is less than "4," the search of the Binary Tree 304 may move to the immediate descendant node 324 of the root node 328 that is associated with a smaller key 310 than the key 310 associated with the root node 328, here "4." Therefore, the next node 322 in the search process is the node 322 associated with the key 310 labeled "2" as shown in element 183.

Now, if the value of the search is less than "2" the immediate descendant of the node 322 that is associated with a smaller key 310 than the key associated with the parent node 326 is examined. Therefore, in the present example, the immediate descendant node 324 of the node 322 as shown in element 183 is the node 322 associated with the key 310 labeled "1," as shown in element 182. Since there are no descendants of the node 322 as shown in element 182 it will be appreciated that it is a leaf node 329. In the present example, if the value 330 of the search is less than "1," then encountering a leaf node 329 indicates that the search is complete.

As shown in the present example, if the value 330 of the search is greater than "2" and less than "4," the parent node 326 as shown in element 183 is examined. Then the node 322 associated with the key 310 labeled "3" as shown in element 184 that is a descendant node of the parent node associated with the key 310 labeled "2" as shown in element 183 is examined.

Recall that the descendant nodes 324 that are associated with a key 310 that is smaller than the key 310 associated with the parent node 326 are located to the left of the parent node 326. Also the descendant nodes 324 that are associated with a key 310 that is greater than the key 310 associated with the parent node 326 are located to the right of the parent node 326. Therefore, the descendant node 324 as shown in element 182 is placed to the left of the parent node 326 as shown in element 183, since the key 310 associated with the descendant node 324 as shown in element 182 is "1," which is less than the key 310 labeled "2" that is associated with the parent node 326 as shown in element 183. Also, the descendant node 324 as shown in element 184 is placed to the right of the parent node 326 as shown in element 183, since the key 310 associated with the descendant node 324 as shown in element 182 is "3," which is greater than the key 310 labeled "2" that is associated with the parent node 326 as shown in element 183.

Also, the node 322 associated with the key 310 labeled "6" as shown in element 187 is a parent node 326 to the descendant node 324 associated with the key 310 labeled "5" as shown in element 186 and to the descendant node 324 associated with the key 310 labeled "7" as shown in element 188. The descendant node 324 as shown in element 186 is placed to the left of the parent node 326 as shown in element 187, since the key 310 associated with the descendant node 324 as shown in element 186 is "5," which is less than the key 310 labeled "6" that is associated with the parent node 326 as shown in element 187. Also, the descendant node 324 as shown in element 188 is placed to the right of the parent node 326 as shown in element 187, since the key 310 associated with the descendant node 324 as shown in element 188 is "7," which is greater than the key 310 labeled "6" that is associated with the parent node 326 as shown in element 187.

It will be appreciated that the Binary Tree 304 illustrated in FIG. 1A is a balanced tree 302. Such a balanced tree 302 requires appropriate order of insertion while building the tree 302 structure, which cannot typically be controlled. A different order of insertion will generate an imbalanced tree 302, which the present embodiment specially handles to efficiently improve the balance of the tree 302.

Figure 1B:
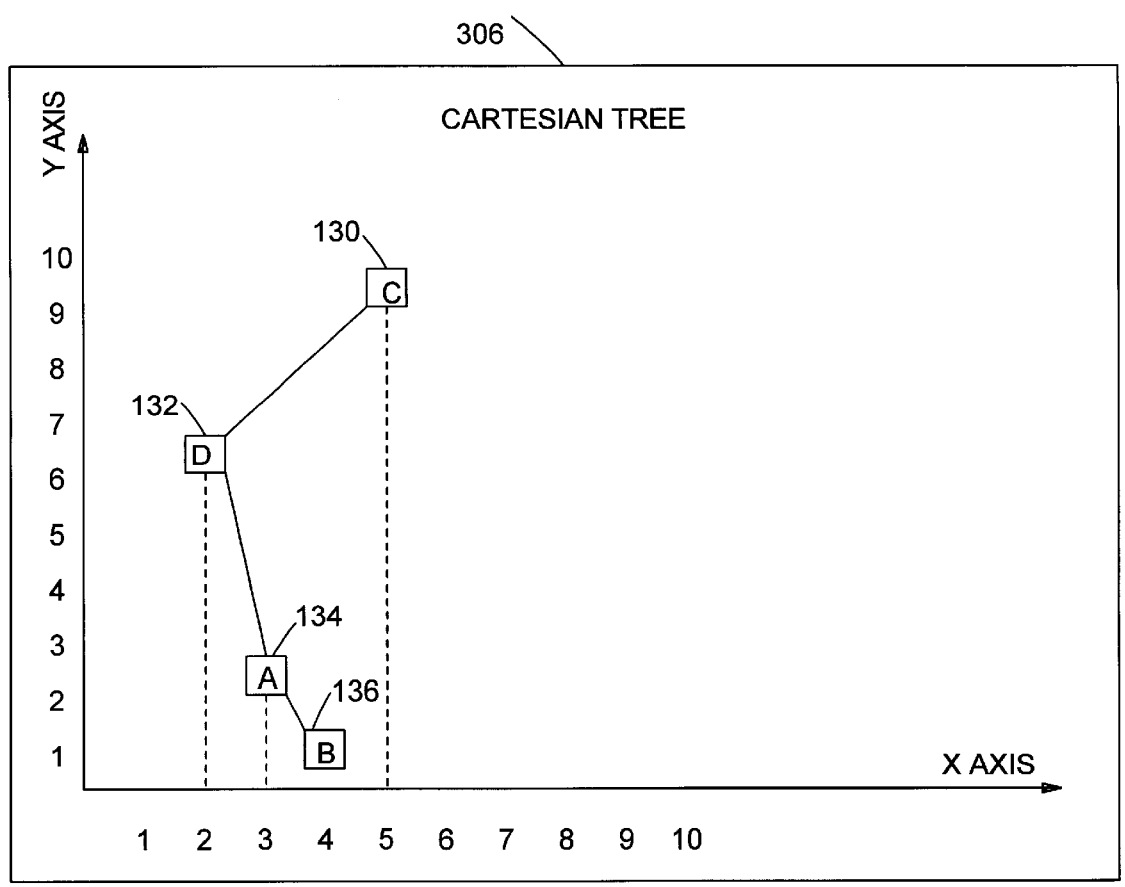
FIG. 1B is a block diagram that illustrates a Cartesian Tree.
Figure 1B:
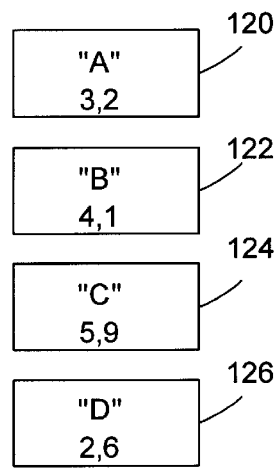

FIG. 1B is a block diagram that illustrates a Cartesian Tree 306 that is a particular type of Binary Tree 304 (as shown in FIG. 3). The Cartesian Tree 306 has a secondary key 314 and the structure of the Cartesian Tree 306 is a heap with regard to the secondary key 314. It will be appreciated that a heap is a data structure in which each parent node 326 has a value 330 (as shown in FIG. 3) that is greater than or equal to the descendants of the parent node 326. In the case of a Cartesian Tree 306, the heap value 330 is the secondary key 314 and may be referred to as a "heap-based secondary key" 314.

A Cartesian Tree 306 has a primary key 312 and a secondary key 314. Therefore, the location of each node 322 in a Cartesian Tree 306 is determined by association of both the primary key 312 and the secondary key 314. Typically the primary key 312 is associated with a value 330 on the X axis when the Cartesian Tree 306 is represented as a Cartesian Graph. The secondary key 314 is associated with a value 330 on the Y axis when the Cartesian Tree 306 is represented as a Cartesian Graph. Those skilled in the art will appreciate the use of the Cartesian Graph that may include a location of nodes 322, or coordinates, both on an X axis position and a Y axis position.

The primary key 312 and the secondary key 314 of the Cartesian Tree 306 may by associated. For instance the information in the node may be used to derive both the primary key 312 and the secondary key 314, or the information in the node 322 may actually represent the primary key 312 and the secondary key may be derived from the information in the node 322. By means of comparison the Cartesian Tree 306 may represent a "treap," in which the primary key 312 and the secondary key 314 are not correlated. For instance if the primary key 312 or the secondary key 314 is a random value 330 then the primary key 312 and the secondary key 314 will not be correlated. A treap is discussed in "Randomized Search Trees," R. Seidel and C. R. Aragon, *Algorithmica*, (1996) 16:464–497.

Referring to FIG. 1B, the insertion of a new node 322 orders the remainder of the nodes 322 in the tree 302 so that nodes 322 with values 330 on the X axis that are less than the X axis value 330 associated with the new node 322 are in one sub-tree, and nodes 322 with values 330 on the X axis that are greater than the X axis value 330 associated with the new node 322 are in another sub-tree. Further, the structure of a Cartesian Tree 306 is secondarily determined by the ordering of the value 330 on the Y axis for the nodes 322 of the Cartesian Tree 306. That is, a new node 322 having a value 330 on the Y axis that is less than or equal to the value 330 on the Y axis of the current node 322 is a descendant node 324 of the current node 322, which is a parent node 326.

By means of example, the following entries 320 (as shown in FIG. 3) have been inserted in the Cartesian Tree 306. Therefore the entry 320 labeled "A" having the coordinates "3,2" is shown in element 120; the entry 320 labeled "B" having the coordinates "4,1" is shown in element 122; the entry 320 labeled "C" having the coordinates "5,9" is shown in element 124; and the entry 320 labeled "D" having the coordinates "2,6" is shown in element 126.

The Cartesian Tree 306 typically includes an X axis and a Y axis. Further the node 322 labeled "C" as shown in element 130 represents the entry 320 labeled "C" as shown in element 124; the node 322 labeled "D" as shown in element 132 represents the entry 320 labeled "D" as shown in element 126; the node 322 labeled "A" as shown in element 134 represents the entry 320 labeled "A" as shown in element 120; and the node 322 labeled "B" as shown in element 136 represents the entry 320 labeled "B" as shown in element 122.

The node 322 labeled "C" as shown in element 130 has the a value 330 of "9" on the Y axis, which is the greatest value 330 on the Y axis associated with the entries 320 in the Cartesian Tree 306. Therefore, the node 322 labeled "C" as shown in element 130 is the root node 328 of the Cartesian Tree 306. After the root node 328 is determined, a division of the left and right side of the Cartesian Tree 306 is made, according to the X axis position of the root node 328. In the present example, the left side of the Cartesian Tree 306 with regard to the root node 328 is represented by values 330 on the X axis that are less than "5."

Next, the nodes 322 on the left side of the root node 328 with regard to the X axis will be compared to determine the immediate descendant node 324 that has the next highest value 330 on the Y axis. In this example, the node 322 labeled "D" as shown in element 132 is the immediate descendant of the root node 328 as shown in element 130. Since there are no nodes 322 on the right side of the root node 328, as shown in element 130, there is no determination of another immediate descendant of the root node 328.

The node 322 labeled "D" as shown in element 132 now becomes a parent node 326 and the remaining entries 320 in the Cartesian Tree 306 are divided between the left and right side of the node 322 labeled "D" with respect to the X axis. Therefore, in this example the node 322 labeled "A" as shown in element 134 has the next highest value 330 on the Y axis and is an immediate descendant of the node 322 labeled "D" as shown in element 132. Now, the node 322 labeled "A" as shown in element 134 becomes a parent node 326. The remaining node 322 labeled "B" as shown in element 136 has a value 330 on the X axis that is greater than the value 330 on the X axis associated with the parent node 322 labeled "A" as shown in element 134. Therefore, the node 322 labeled "B" as shown in element 136 is located to the right of the parent node 326 labeled "A" as shown in element 134.

Figure 2A:
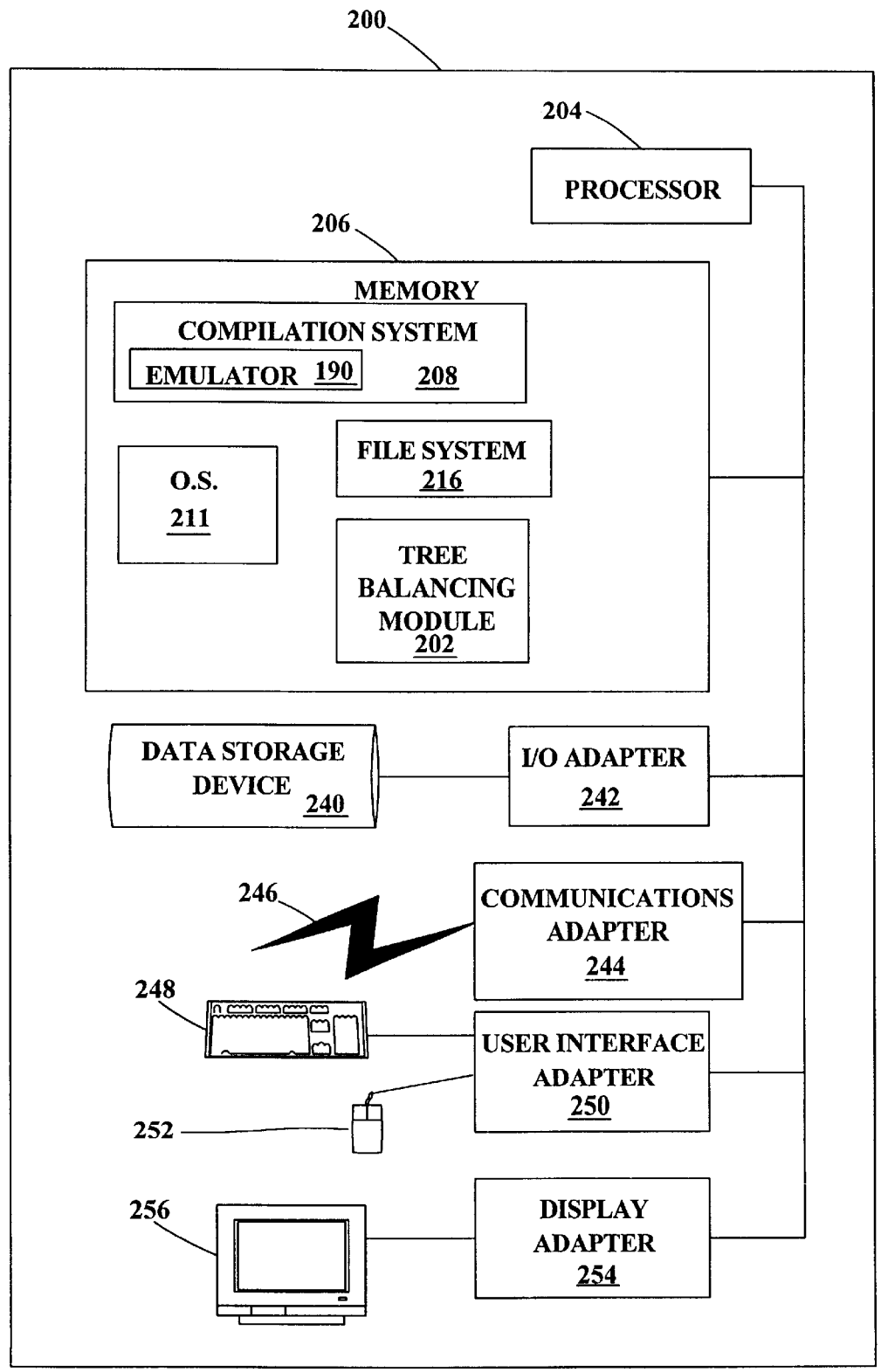
FIG. 2A is a block diagram that illustrates a computer system including the tree balancing module.

FIG. 2A illustrates a tree balancing module 202 that operates in a computer system 200 and that improves the balance of a tree-based data structure 302 (as shown in FIG. 3) used to store information on a computer. Therefore, the tree balancing module 202 reduces the time required to search, update, or perform other common operations on the tree-based data structure 302. When the key 310 associated with a new node 322 (as are shown in FIG. 3) is equal to the key 310 associated with another node 322 in the tree 302, the present embodiment manages the operation of inserting the new node 322 in a tree 302 such that the tree 302 is balanced. Further, when the values 330 (as shown in FIG. 3) associated with the nodes 322 in a tree 302 progress in a relatively ordered fashion, the present embodiment specially handles operations that manage a tree 302 to ensure that the nodes 322 in the tree 302 are balanced as determined by the order of the nodes 322. Therefore, the tree balancing module 202 novelly manages searching, updating, and other associated operations of a tree 302.

The tree balancing module 202 includes instructions 308 (as shown in FIG. 3) and data that may be referred to as "values" 330 such as integer, real, or complex numbers; or characters. Alternatively, the values 330 may be pointers that reference values 330. Therefore, a pointer provides direction to locate a referenced value 330. For instance, an instruction 308 may represent a computer address 325 (as shown in FIG. 3) that may be a computer hardware register or a location in the memory 206. Instructions 308 may also include variables that are identifiers for values 330. That is, the variables may provide storage for values 330. By means of example, information about instructions 308 in a computer system may be stored in a tree 302.

Often information stored in a tree 302 is the same size and the key 310 associated with a node 322 in a tree 302 may correspondingly be the same value 330. Alternatively, a node 322 in a tree 302 may progress in patterned order. Therefore a tree 302 of the past is often degenerate and does not enable quick searching of the nodes 322 in the tree 302. The tree balancing module 202 introduces ordered values 330 that are associated with the nodes 322 in a tree 302 and that are balanced thereby balancing the tree 302.

FIG. 2A further represents the computer system 200 that includes components such as a processor 204, the memory 206, a data storage device 240, an input/output (I/O) adapter 242, a communications adapter 244, a communications network 246, a user interface adapter 250, a keyboard 248, a mouse 252, a display adapter 254, and a computer monitor 256. It will be understood by those skilled in the relevant art that there are many possible configurations of the components of the computer system 200 and that some components that may typically be included in the computer system 200 are not shown.

It will be understood by those skilled in the art that the functions ascribed to the tree balancing module 202, or any of its functional files, typically are performed by a central processing unit that is embodied in FIG. 2A as the processor 204 executing such software instructions 308.

The processor 204 typically operates in cooperation with software programs such as the compilation system 208, the operating system (O.S.) 211, and the tree balancing module 202. Henceforth, the fact of such cooperation among the processor 204 and the tree balancing module 202, whether implemented in software, hardware, firmware, or any combination thereof, may therefore not be repeated or further described, but will be implied. The tree balancing module 202 typically operates in cooperation with the O.S. 211 but is not limited to such operation. For example the tree balancing module 202 may operate in cooperation with a compilation system 208.

The O.S. 211 may cooperate with a file system 216 that manages the storage and access to files within the computer system 200. Files typically include instructions 308 and data. The interaction between the file system 216 and the O.S. 211 will be appreciated by those skilled in the art.

It will also be understood by those skilled in the relevant art that the functions ascribed to the tree balancing module 202 and its functional files, whether implemented in software, hardware, firmware, or any combination thereof, may in some embodiments be included in the functions of the O.S. 211. That is, the O.S. 211 may include files from the tree balancing module 202. In such embodiments, the functions ascribed to the tree balancing module 202 typically are performed by the processor 204 executing such software instructions 308 in cooperation with aspects of the O.S. 211 that incorporate the tree balancing module 202. Therefore, in such embodiments, cooperation by the tree balancing module 202 with aspects of the O.S. 211 will not be stated, but will be understood to be implied.

Computer memory 206 may be any of a variety of known memory storage devices or future memory devices, including any commonly available random access memory (RAM), cache memory, magnetic medium such as a resident hard disk, or other memory storage devices. In one embodiment the O.S. 211 and the tree balancing module 202 may reside in the memory 206 during execution in the computer system 200. The term "storage" refers herein to computer resources such as memory 206, and may be used to store data or instructions 308 used in executing a computer program.

By means of example, the present embodiment may operate to improve the balance of a tree 302 that may store information about a computer resource used during execution, such as a free list that contains information about portions of the computer memory 206 that are free and therefore available for allocation. Therefore, the efficiency of access to free list information contained in the tree 302 will impact the efficiency of allocation of the memory 206 during execution of the instructions 308 on the computer system 200.

The compilation system 208 and the O.S. 211 may also reside in the memory 206 when the tree balancing module 202 is operating. Further, the compilation system 208 may operate in cooperation with the O.S. 211 to execute the tree balancing module 202. That is, the present embodiment may employ the compilation system 208 to resolve any system-specific information such as address 325 locations that are necessary to execute the tree balancing module 202 in the computer system 200.

It will be appreciated that "execute" refers to the process of manipulating software or firmware instructions 308 for operation on the computer system 200. The term "code" refers to instructions 308 or data used by the computer system 200 for the purpose of generating instructions 308 or data that execute in the computer system 200. Also, the term "module" 327 (as shown in FIG. 3) may refer to a software "procedure" or "function" such as a unit of code that may be independently compiled. A "program" contains software program code, may contain at least one module 327, and may be independently compiled and executed.

It will be appreciated that an emulator 290 may be included in the computer system 200. The emulator 290 substitutes instructions 308 typically associated with a different computer system 200 than the executing computer system 200, for the original instructions 308. It will be appreciated that the substituted instructions 308 may be associated with a hardware, software, or firmware representation of a different computer system 200. The cooperation of the tree balancing module 202 and the emulator 290 is discussed with reference to FIG. 2C.

The tree balancing module 202 may be implemented in the "C" programming language, although it will be understood by those skilled in the relevant art that other programming languages could be used. Also, the tree balancing module 202 may be implemented in any combination of software, hardware, or firmware.

The data storage device 240 may be any of a variety of known or future devices, including a compact disk drive, a tape drive, a removable hard disk drive, or a diskette drive. Any such program storage device may communicate with the I/O adapter 242, that in turn communicates with other components in the computer system 200, to retrieve and store data used by the computer system 200. As will be appreciated, such program storage devices typically include a computer usable storage medium having stored therein a computer software program and data.

Input devices could include any of a variety of known I/O devices for accepting information from a user, whether a human or a machine, whether local or remote. Such devices include, for example a keyboard 248, a mouse 252, a touch-screen display, a touch pad, a microphone with a voice recognition device, a network card, or a modem. The input devices may communicate with a user interface I/O adapter 242 that in turn communicates with components in the computer system 200 to process I/O commands. Output devices could include any of a variety of known I/O devices for presenting information to a user, whether a human or a machine, whether local or remote. Such devices include, for example, the computer monitor 256, a printer, an audio speaker with a voice synthesis device, a network card, or a modem. Output devices such as the monitor 256 may communicate with the components in the computer system 200 through the display adapter 254. Input/output devices could also include any of a variety of known data storage devices 240 including a compact disk drive, a tape drive, a removable hard disk drive, or a diskette drive.

By way of illustration, program code may typically be loaded through an input device and may be stored on the data storage device 240. A copy of the code or portions of it, may alternatively be placed by the processor 204 into the memory 206 for execution on the computer system 200.

The computer system 200 may communicate with the network 246 through a communications adapter 244, such as a networking card. The network 246 may be a local area network, a wide area network, or another known computer network or future computer network. It will be appreciated that the I/O device used by the tree balancing module 202 may be connected to the network 246 through the communications adapter 246 and therefore may not be co-located with the computer system 200. It will be further appreciated that other portions of the computer system 200, such as the data storage device 240 and the monitor 256, may be connected to the network 246 through the communications adapter 244 and may not be co-located.

Figure 2B:
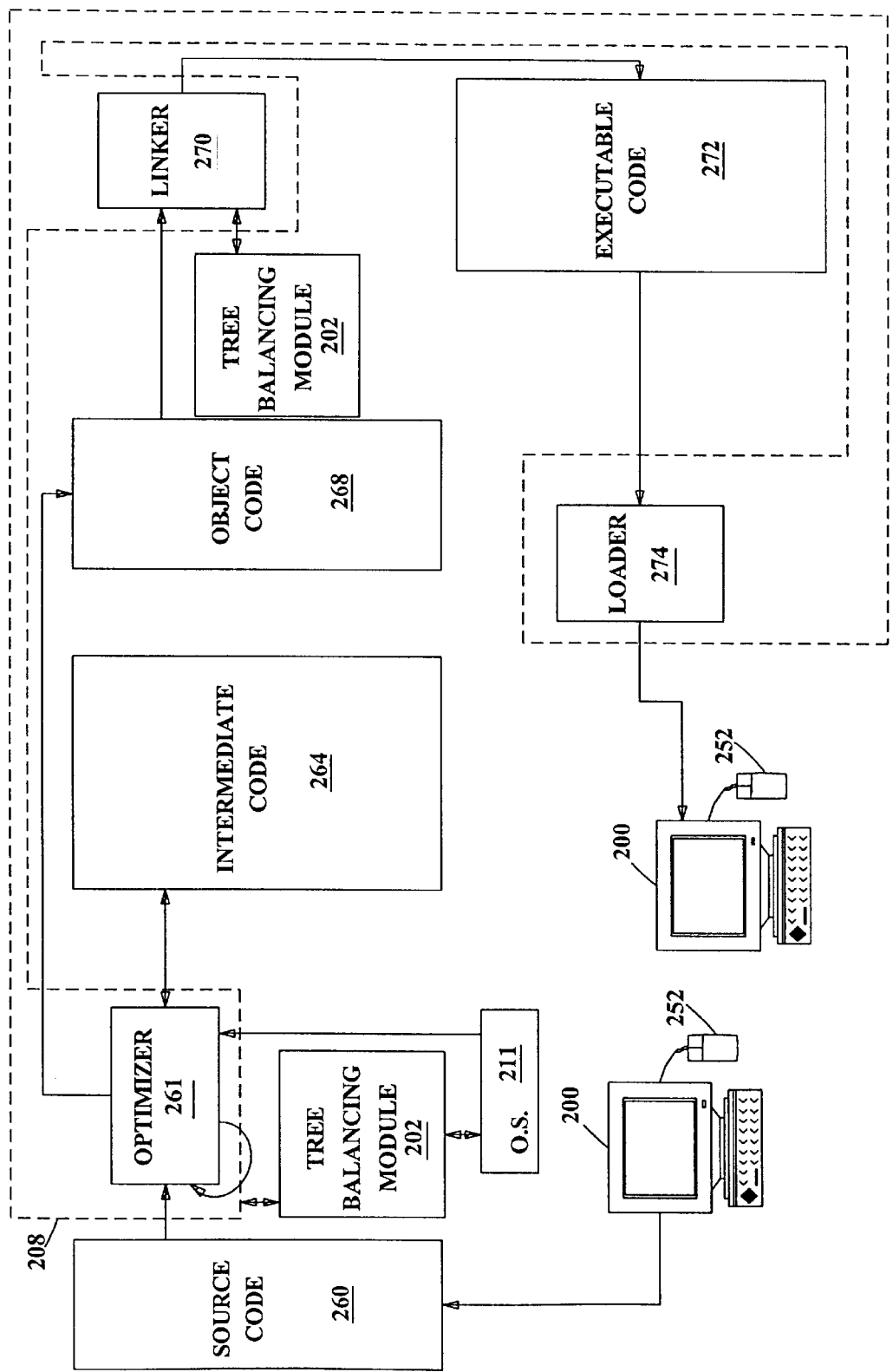
FIG. 2B is a block diagram that illustrates a form of compiler technology that operates with the tree balancing module.

As shown in FIG. 2B the present embodiment may be a software module 327 that cooperates with a compiler technology that may use software source code 260 that is generated from input computer system 200 I/O devices such as a keyboard 248 (as shown in FIG. 2A) and a mouse 252.

It will be appreciated that the present embodiment operates on any multi-purpose computer system 200 and is not limited to the illustration herein. A software developer may create source code 260 typically in a high-level programming language such as "C."

The computer system 200 may manage the processing of the source code 260 through the O.S. 211. The O.S. 211 may direct the processing of the source code 260 by a compiler optimizer 261 that may generate intermediate code 264 from the source code 260. The intermediate code 264 typically is a list of intermediate-level language instructions 308.

The present embodiment may operate in cooperation with the O.S. 211 and the compilation system 308 by improving the structure of trees 302 (as shown in FIG. 3) that may be used by the O.S. 211, the compilation system 308, or that may be used by other computer-based software applications. That is, the present embodiment provides the capability of improving the balance of a tree-based data structure 302 that may be used in a variety ways within the computer system 200, thereby improving the efficiency of operations associated with the tree-based data structure 302.

The optimizer 261 may optimize code while preserving the structure and sequence of source operations. For instance, the optimizer 261 may optimize array contents while retaining the array accesses in the source code 260. Alternatively, the optimizer 261 may generate object code 268 that includes optimization changes which may be dependent on the particular multi-purpose computer system 200 on which the compiler optimizer technology operates. These machine-specific changes may allow the optimizer 261 to generate code that is highly tailored to optimally run on a specific multi-purpose computer system 200; for example code may be tailored to support different cache organizations or a different number of computer processors 204 (as shown in FIG. 2A). The optimizer 261 or any other functional component of the compilation system 208 may cooperate with the tree balancing module 202 to create tree-based data structures 302 that are ordered to create a balanced tree 302.

In the present embodiment the linker 270 may operate on the output of the optimizer 261 which may be object code 268. In order to execute the object code 268 it is combined with one or more object code modules 327 to create combined user process executable code 272 by a process known as linking. Further, the tree balancing module 202 may be advantageously used in cooperation with the linker 270 to create tree-based data structures 302 that are more balanced than in the past.

The present embodiment may employ a linker 270 to resolve any undefined computer location references in the object code 268 and to generate executable code 272 capable of executing on an output multi-purpose computer system 200 with I/O devices such as a keyboard 248 and a mouse 252. It will be appreciated that the input computer system 200 and the output computer system 200 may be the same computer system 200 and are not limited to the configuration illustrated.

In the present embodiment the executable code 272 may be formatted to enable a loader 274 to load the executable code 272 into the computer system 200 for execution. The executable code 272 may be any of a variety of known executable files or an executable file of a type to be developed in the future. Examples of such known files are those having an extension of ".exe" operating under a DOS or Windows operating system or an "a.out" file of an O.S. 211 marketed under the trademark UNIX®. It will be appreciated that typically the compilation system 208 may include the optimizer 261, the linker 270, and the loader 274.

Figure 2C:
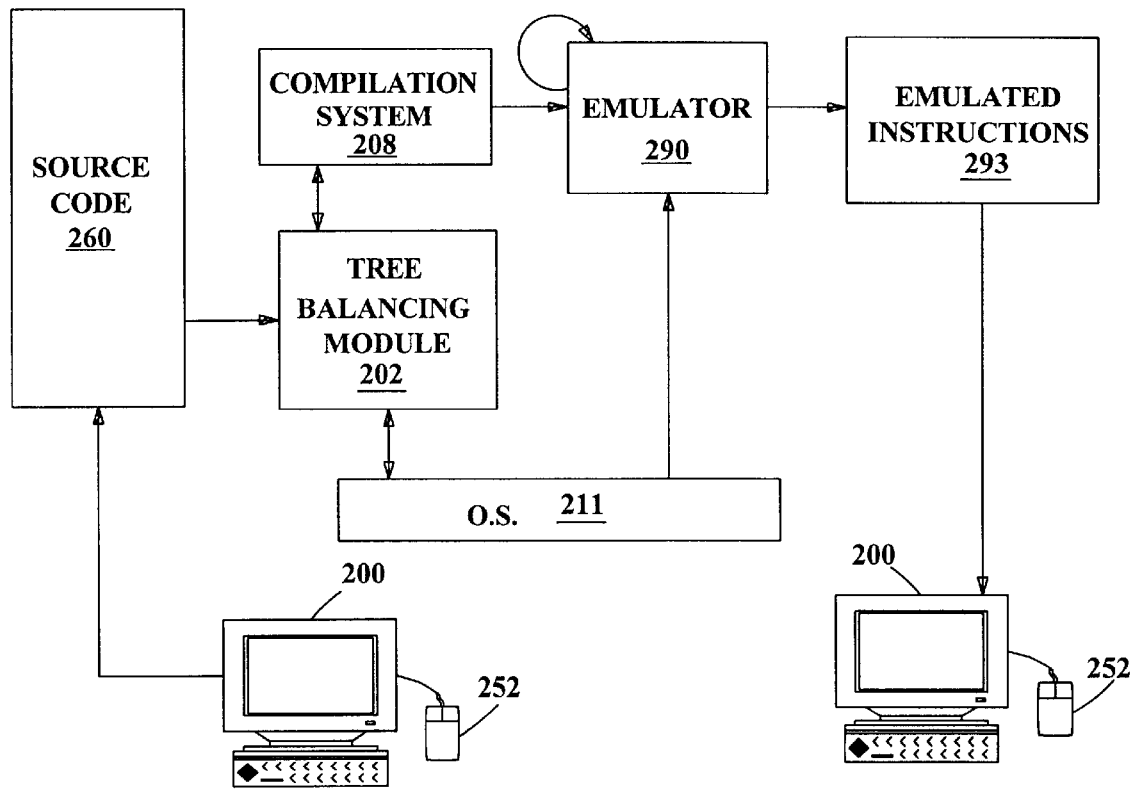
FIG. 2C is a block diagram that illustrates a form of emulator technology that operates with the tree balancing module.

FIG. 2C is a block diagram that illustrates the operation of the tree balancing module 202 that operates in coordination with the emulator 290, such as the product marketed under the trademark JAVA Virtual Machine.™ Source code 260 typically is loaded through an input device and may be stored on the data storage device 240 (as shown in FIG. 2A). A copy of the source code 260 or portions of it, may alternatively be placed by the processor 204 into the memory 206 (as are shown in FIG. 2A) for execution on the computer system 200. The O.S. 211 may operate to associate the source code 260 with the compilation system 208 that may generate code for use by the emulator 290. Further, the tree balancing module 202 may operate with the O.S. 211 to generate an improved tree 302 (as shown in FIG. 3) that is more balanced than trees 302 of the past. The tree balancing module 202 may also operate with the compilation system 208 as described with reference to FIG. 2B.

The emulator 290 may then operate, typically in an iterative manner, to create emulated instructions 293. Typically the emulated instructions 293 are associated with a different computer system 200 than the executing computer system 200.

FIG. 3 illustrates data structures and modules 327 used by the tree balancing module 202 that may be stored in the memory 206. Further, FIG. 3 represents memory-based computer structures that may be embodied in the memory 206 during the execution of the tree balancing module 202. The memory-based computer structures may be representative of a class of similar memory-based computer structures. The memory 206 may include the following:

a tree balancing module 202 that improves the balance of trees 302 in a computer system 200 (as shown in FIG. 2A);

instructions 308 that are operating directives of the computer system 200;

a bit 309 that is a unit of information in a computer system 200, and the term "binary value" and "bit" will be used interchangeably herein;

a tree 302 that is a computer-based representation of connected information that may include ordered nodes 322, such as a first node 322 and a second node 322;

a Binary Tree 304 that represents a descendant node 324 of a parent node 326 as either a first node 322 or a second node 322;

a Cartesian Tree 306 that represents descendant nodes 324 of a parent node 326 as having a value 330 less than the value 330 of a parent node 326;

a key 310 that is derived by an operation that is associated with at least one value 330 associated with a node 322 and that is used to insert and locate a node 322 in a tree 302;

a primary key 312 that is the primary value 330 used to insert and locate a node 322 in a tree 302;

a secondary key 314 that is used to augment the insertion and location of a node 322 in a tree 302;

an address 325 that is a location of information stored or used in a computer system 200;

a module 327 that is a unit of code that may be independently compiled;

an entry 320 that represents two associated values 330 that may be included in a Cartesian Tree 306;

a node 322 that is a unit of information typically included in a tree 302;

a descendant node 324 that is associated in a tree-based hierarchy below the parent node 326;

a parent node 326 that is associated in a tree-based hierarchy above the descendant node 324;

a root node 328 that is associated in a tree-based hierarchy with descendant nodes 324 and is not associated with a parent node 326;

a leaf node 329 that is associated in a tree-based hierarchy with a parent node 326 and is not associated with a descendant node 324;

a value 330 that is computer-based information that may be associated with a node 322 either as information contained in the node 322 or as a representation of the location of the node 322, such as a memory-based address, and the value 330 maybe used by the tree balancing module 202;

a bit reversal order value 334 that is the result of the ordering of at least two values 330 to which the bit reversal operation has been applied and is used by the tree balancing module 202 to balance the tree 302;

a bit reversal value 335 that is the result of reversing each representative bit 309 of a value 330 so that the least significant bit become the most significant bit, and so on;

a compilation system 208 that translates program code into instructions 308 that operate on the computer system 200;

an emulator 290 that substitutes instructions 308 typically associated with a different computer system 200 than the executing computer system 200;

source code 260 that is manipulated by a computer system 200 and that is typically written in a high-level programming language such as "C;"

intermediate code 264 that is a list of intermediate-level language instructions 308;

object code 268 that includes optimization changes which may be dependent on the particular multi-purpose computer system 200 on which the compilation system 208 operates;

executable code 272 that is capable of executing on a multi-purpose computer system 200;

as well as other data structures and modules 327.

Figure 4A:
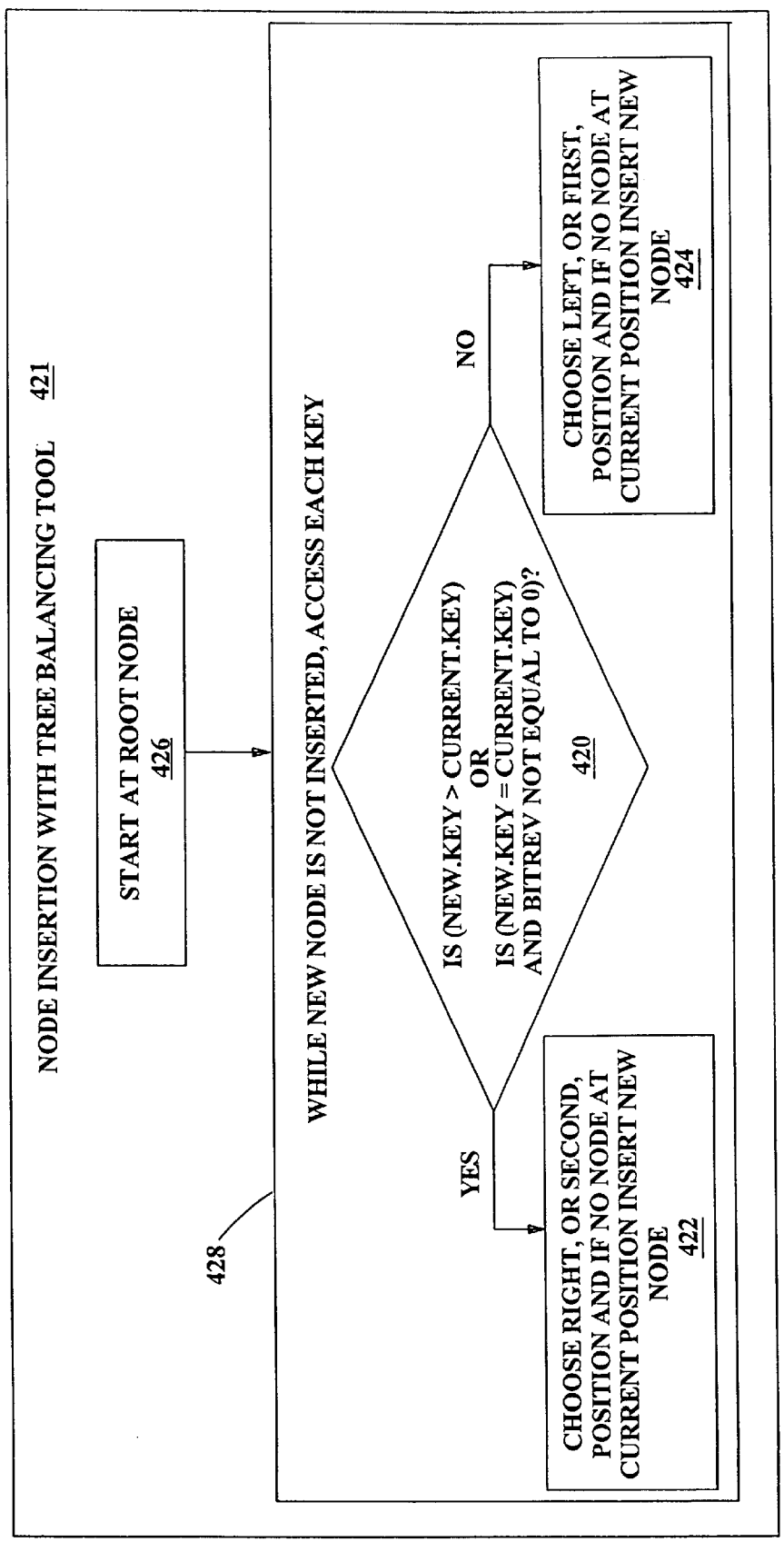
FIG. 4A is a flow diagram that illustrates node insertion in a tree with the operation of the present invention.

FIG. 4A is a flow diagram that illustrates the insertion of a node 322 in a tree 302 with the operation of the tree balancing module 202, as shown in element 421. The present embodiment novelly operates to insert a node 322 in a tree 302 by use of a bit reversal operation as described with reference to FIG. 4B thereby balancing a tree 302. Initially, the search for an appropriate location for insertion of a node 322 starts at the root node 328 of the tree 302, as shown in element 426. Then, while a new node 322 has not been inserted, the key 310 associated with each node 322 in the tree 302 is accessed as shown in element 428. The tree balancing module 202, the tree 302, the node 322, the key 310, the binary tree 304, the tree 302, and the value 330 are discussed in reference to FIG. 3.

A test, as shown in element 420, is executed to determine whether the value 330 of a key 310 that is associated with a new node 322 is greater than the value 330 of a key 310 associated with a current node 322 in the tree 302.

Further, the test as shown in element 420 introduces the novel aspects of the present embodiment by alternatively testing two conditions. First the tree balancing module 202 tests whether the value associated with a new node 322, here "NEW.KEY" is equal to the value 330 associated with a current node 322, here "CURRENT.KEY." The second condition of the test is the result of the bit reversal operation that determines the greater of the two bit reversal values 335. It will be appreciated that the bit reversal value 335 (as shown in FIG. 3) is a value 330 associated with a node 322 in which the bits 309 representing the value 330 have been reversed. Further, the operation described with reference to FIG. 4B determines whether a bit reversal value 335 is greater than another bit reversal value 335.

If the result of the test of element 420 is true, then the value 330 of the key 310 associated with the new node 322 is greater than the value 330 of the key 310 associated with the current node 322 according to the bit reversal operation. Therefore, the position to the right, or second position, with respect to the current node 322 is chosen for the new node 322, and if no node 322 is located at the current position, the new node 322 is inserted as shown element 422.

Alternatively, if the result of the test of element 420 is false, then the value 330 of the key 310 associated with the new node 322 is less than the value 330 of the key 310 associated with the current node 322 according to the bit reversal operation. Therefore the position to the left, or first position, with respect to the current node 322 is chosen for the new node 322, and if no node 322 is located at the current position, the new node 322 is inserted as shown in element 424.

The present embodiment may operate on Binary Trees 304 and on Cartesian Trees 306 including Cartesian Trees 306 with the properties of a treap. Therefore, the novel operation of the present embodiment as shown in element 420 may be used to determine the position of a node 322 in a Binary Tree 304.

Alternatively, the novel operation of the present embodiment as shown in element 420 may be used to determine the position of a node 322 in a Cartesian Tree 306 that is associated with primary key 312 and a secondary key 314 of a Cartesian Tree 306. By determining the ordering of primary keys 312 or secondary trees 314 by the bit reversal operation the present embodiment introduces jitter so that nodes 322 in a Cartesian Tree 306 are well balanced.

The advantageous operation of the present embodiment may also be used to search a computer-based tree structure 302 to access information associated with the tree 302. That is, the operation of comparing keys while searching a tree 302 may be improved by use of the tree balancing module 202 that efficiently compares two values 330 by use of the bit reversal operation.

Tables 1 and 2: Comparison of Two Bit Reversal Values

Figure 4B:
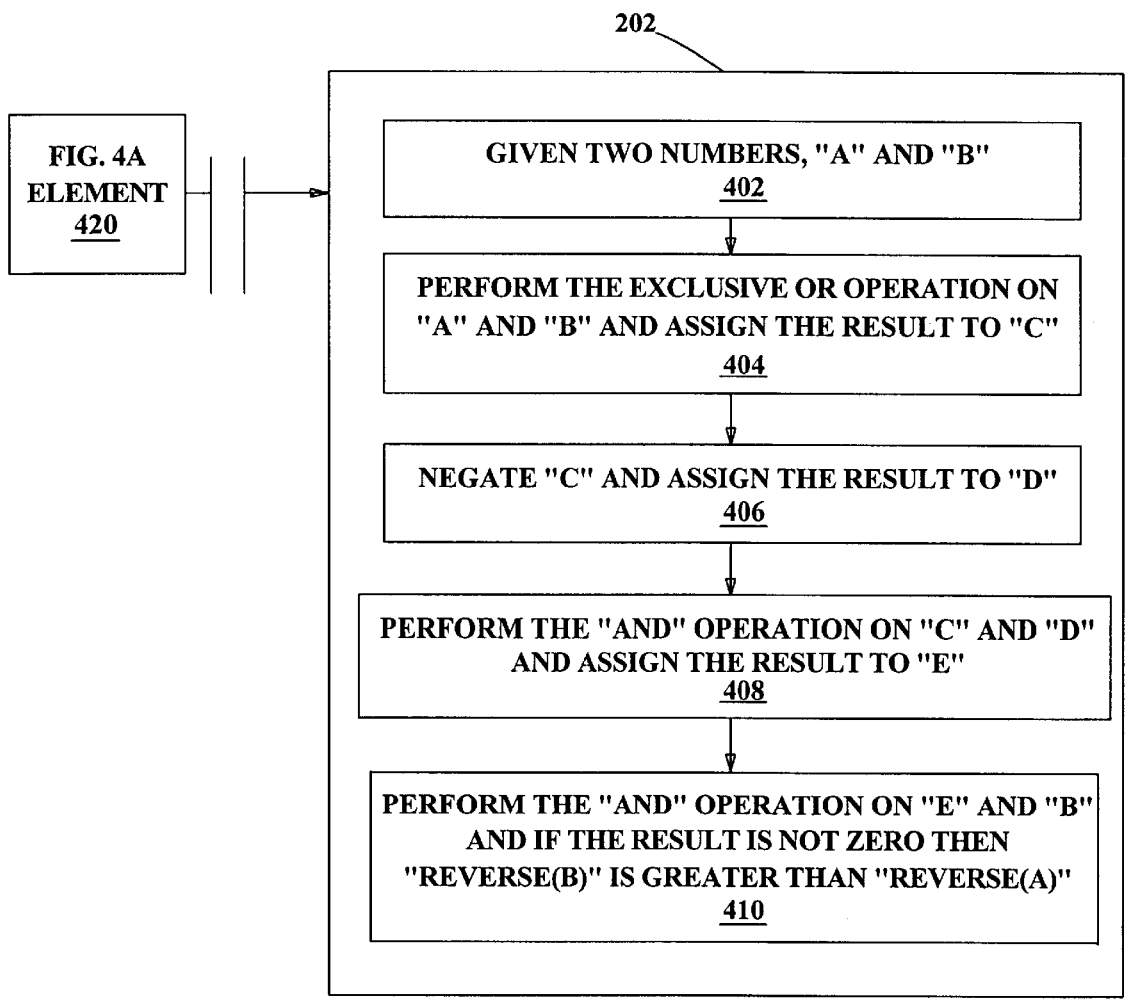
FIG. 4B is a flow diagram that illustrates the bit reversal operation of the present invention.

The present embodiment novelly implements the bit reversal operation as described with respect to FIG. 4B. The bit reversal operation determines whether the reverse of a value 330 is less than the reverse of another value 330. For instance, as shown in line 1 of Table 1 the present embodiment novelly determines whether the reverse of the value 330 labeled "A" is less than the reverse of the value 330 labeled "B."

Computer systems 200 (as shown in FIG. 2A) typically operate in a binary number system rather than a decimal number system. Both numbering systems are positional, and the present embodiment operates on bits 309 in the binary number system. The difference between binary and decimal is that in a binary number system, the only bits 309 allowed are "0" and "1." Those skilled in the art will appreciate that the binary representation of a value 330 is one in which each bit 309 position increases by a multiple of two. For example, the right most bit 309 represents the value "1," the next rightmost bit 309 represents the value "2," and next rightmost bit 309 represents the value "4," and the fourth bit 309 from the right represents the value As shown in line 2 of Table 1, when the values 330 being compared are represented by bits 309 such as those used in a computer system 200, each bit 309 position may be compared to find the largest value 330 by locating the most significant bit 309 that is different, here represented as "MSB." That is, the leftmost bit 309 position at which the two values 330 differ is identified and the value 330 that has the greater value 330 in this bit 309 position is greater. More particularly, for bit-represented values 330, when the most significant bit 309 that is different between two values 330 under comparison is located, the value 330 having a "1" is the larger value 330.

Therefore as shown in line 2, to compute whether REVERSE (A)<REVERSE (B) the present embodiment identifies the leftmost bit 309 that differs and determines whether the bit 309 associated with the value 330 labeled "REVERSE(B)" or associated with the value 330 labeled "REVERSE(A)" is greater. More particularly, to identify which bit 309 positions differ, the "XOR" operation commonly provided in instruction sets of computer systems 200 and processors 204 (as shown in FIG. 2A) may be used. The "XOR" operation is discussed with reference to FIG. 4B and may be referred to as a "logical XOR" operation herein.

Continuing to reference line 2, the leftmost bit 309 position at which REVERSE (A) and REVERSE(B) differ is shown by "MSB(REVERSE(A) XOR REVERSE (B))." Since there are only two bits 309 in a binary number system, "0" and "1," the greater is one. The "AND" operation may be performed on the values 330 labeled "REVERSE(B)" and "MSB(REVERSE(A) XOR REVERSE (B))." The "AND" operation is discussed with reference to FIG. 4B and may be referred to as a "logical AND" operation herein. If the result of the "AND" operation that used the value 230 labeled "REVERSE(B)" is not zero, the two values 230 differ and the value 330 labeled "REVERSE(B)" has a "1" in the differing bit 309 position. Therefore, since the value 330 labeled "REVERSE(A)" differs from the value 330 labeled "REVERSE(B)" in the differing bit 309 position, the value 330 labeled "REVERSE(A)" has a "0" in the differing bit position. Since "REVERSE(B)" has a "1" and "REVERSE (A)" has a "0" in the differing bit position, the value 330 labeled "REVERSE(B)" is greater than the value 330 labeled "REVERSE(A)." Therefore, if the result of the operation shown in line 2 is not zero, then the value 330 labeled "REVERSE(B)" is greater than the value 330 labeled "REVERSE(A)."

The operation of the present embodiment as described with respect to Table 1 compares the value 330 labeled "A" to the value 330 labeled "B." However, it will be appreciated that the operation of the present embodiment may also compare the value 330 labeled "B" to the value 330 labeled "A," in which case if the result of the operation shown in line 2 is not zero then value 330 labeled "REVERSE(A)" is greater than the value 330 labeled "REVERSE(B)."

As shown in line 3 of Table 1, the present embodiment simplifies the operation shown in line 2 of Table 1 by performing a single reversal on the results of the "XOR" operation applied to each bit 309 position rather than reversing each operand and then performing the "XOR" operation. The simplification of the operation shown in line 3 of Table 1 is further discussed with reference to FIG. 4B.

As shown in line 4 of Table 1, the present embodiment determines the greater value 330 between two reversed values 330, bit reversal values 335, by novelly using the non-reversed values 330. The present embodiment identifies the rightmost bit 309 position at which the two non-reversed values 330 differ, rather than the leftmost bit 309 position at which the original values 330 differ. That is, rather than actually reversing the numbers, they are treated as though they were reversed and scanned right to left rather than left to right to locate the first differing bit. Therefore as shown in line 4 of Table 1, the present embodiment further simplifies the operation as shown in line 3 equating the least significant bit 309, here represented by "LSB," of a binary value 309 with the most significant bit 309 of the reversal of the value 330. Therefore, the present embodiment operates on the simplified operation of line 4 of Table 1 as described with reference to FIG. 4B. Lines 3 and 4 do not represent the same value 330 but novelly operate equivalently to determine the greater of two reversed values 330, the bit reversal order value 334. For example, line 4 represents the reverse of line 3.

The present embodiment extends the operation as shown in line 4 of Table 1 to the operation as shown in line 5 of Table 1 that exploits instructions 308 (as shown in FIG. 3) that are common to computer systems 200 and will be discussed with reference to FIG. 4B. The operation as shown in line 5 of Table 1 represents the one embodiment of the tree balancing module 202 and may be represented by alternative operations such line 5 of Table 2 that will be discussed with reference to FIG. 4C. Tables 1 and 2 illustrate the compact solution of the tree balancing module 202.

TABLE 1

| | |
|---|---|
| REVERSE (A) < REVERSE (B) | line 1 |
| [MSB (REVERSE(A) XOR REVERSE (B))] AND REVERSE (B) | line 2 |
| [MSB (REVERSE (A XOR B))] AND REVERSE (B) | line 3 |
| [LSB (A XOR B)] AND B | line 4 |
| [(A XOR B) AND − (A XOR B)] AND B | line 5 |

TABLE 2

Alternate Embodiment of Line 5 of Table 1

| | |
|---|---|
| [(A − B) AND (B − A)] AND B | line 5 |

FIG. 4B is a flow diagram that represents the bit reversal operation of the tree balancing module 202 and is invoked from element 420 as described with reference to FIG. 4A. The bit reversal operation determines the greater of two bit reversal values 335, here labeled "REVERSE(A)," and "REVERSE(B)." When a new node 322 is inserted into the tree 302, the key 310 (as are shown in FIG. 3) associated with the new node 322 is compared to the key 310 associated with a current node 322 in the tree 302. The present embodiment associates a bit reversal value 335 with each node 322 and determines placement of the node 322 in the tree 302 based on the comparison of each bit reversal value 335 to other bit reversal values 335 associated with nodes 322 in the tree 302. Further, the present embodiment may be used to search the nodes 322 of a tree 302 to locate information associated with the tree 302.

The present embodiment novelly determines the greater value of two bit reversal values 335. Therefore, two values 330, here labeled "A" and "B," are compared as shown in element 402. When the operation of the tree balancing module 202 results in a non-zero number, the bit reversal value 335 of "B" is determined to be greater than the bit reversal value 335 of "A." Therefore, the node 322 associated with the bit reversal value 335 of "B" is correspondingly inserted in the tree 302 in order with respect to the other nodes 322 in the tree 302. Thereby the present embodiment novelly determines a location for a node 322 that results in a balanced tree 302 more efficiently than in the past.

Using the operation described in line 5 of Table 1, the exclusive or operation, typically referred to as "XOR," is performed on each bit 309 position of the values 330 labeled "A" and "B" and the results are assigned to the value 330 labeled "C," as shown in element 404. Typically, operations on bits 309 that are represented by a "1" or "0" may alternatively be considered to have a value 330 of "TRUE" that corresponds to a "1" or "FALSE" that corresponds to a "0." According to the "XOR" operation for each bit 309 position, when only one of two bits 309 is "TRUE," the result of the "XOR" operation is "TRUE." Therefore, if both of the bits 209 are "TRUE" or both of the values 330 are "FALSE," then the result of the "XOR" operation is "FALSE."

By means of example, if "FIRSTVALUE=TRUE" and "SECONDVALUE=FALSE" then the result of the "XOR" operation on FIRSTVALUE and SECONDVALUE is "TRUE." However, if "FIRSTVALUE=TRUE" and SECONDVALUE=TRUE" then the result of the "XOR" operation on FIRSTVALUE and SECONDVALUE is "FALSE." Alternatively, if "FIRSTVALUE=FALSE" and SECONDVALUE=FALSE" then the result of the "XOR" operation on FIRSTVALUE and SECONDVALUE is "FALSE."

Next we need to identify which of these bit 309 positions is the rightmost position with different bit values 309 and therefore is the least significant differing bit 309. Computer system 200 instruction sets and processors 204 (as are shown in FIG. 2A) typically do not provide this operation in a single instruction 308 (as shown in FIG. 3). Therefore, the present invention uses the logical operation "AND" in conjunction with the arithmetic operation "negation" to compute the rightmost bit 309 position with different binary values 309 as shown in line 5 of Table 1.

As is known in the art, the negation of a value 330 represented in two's complement binary form may be found by adding one to the complement of the original value 330. The complement of the original value 330, as represented in binary form, is a binary representation in which each original bit 309 equal to "1" is changed to "0," and each original bit 309 equal to "0" is changed to "1." Two's complement is a computer-based system that represents negative numbers in binary form by complementing each bit 309 of the representation of the positive magnitude of the number and adding one to the complemented number.

According to the "AND" operation, only when both of the bits 309 are "TRUE," will the results of the "AND" operation be "TRUE." Therefore, if one or both of the bits 309 is "FALSE," then the result of the "AND" operation is "FALSE." By means of example, if "FIRSTVALUE= TRUE" and "SECONDVALUE=TRUE" then the result of the "AND" operation on FIRSTVALUE and SECOND-VALUE is "TRUE." However, if "FIRSTVALUE=FALSE" and SECONDVALUE=TRUE" then the result of the "AND" operation on FIRSTVALUE and SECONDVALUE is "FALSE." Alternatively, if "FIRSTVALUE=FALSE" and SECONDVALUE=FALSE" then the result of the "AND" operation on FIRSTVALUE and SECONDVALUE is "FALSE."

To determine the rightmost bit 309 position of the value 330 labeled "C" that has a non-zero bit 309, the negation of the value 330 labeled "C" is determined and assigned to the value 330 labeled "D" (D=−C), as shown in element 406. Then, the logical "AND" operation is performed on the value 330 labeled "D" and the value 330 labeled "C" and the result is assigned to the value 330 labeled "E" (E=D AND C), as shown in element 408. Therefore the value 330 labeled "E" will have only the rightmost nonzero bit 309 in C set to "1" and all other bits 309 will be "0."

Since negation on a two's complement computer system 200 is equivalent to complementation followed by addition of one, when one is added to the complement of a value 330 the rightmost bits 309 having "1" are converted into zeros as the addition process carries a "1" to the next bit 309 until the rightmost zero bit 309 in the value 330 labeled "C" is encountered. The rightmost zero bit 309 in the value 330 labeled "C" is converted into a "1" as the addition process continues. The remaining bits 309 to the left of the rightmost zero bit 309 remain unchanged by the addition process.

Therefore, the rightmost nonzero bit 309 in the value 330 labeled "C" became a "0" in the complement of the value 330 labeled "C" and then became a "1" in the value labeled "D" according to the operation shown in element 408. All other nonzero bits 309 in the value labeled "C" became "0" in the complement of the value 330 labeled "C" and remained "0" in the value 330 labeled "D." Therefore, as shown in element 408 the single bit 309 position that is "1" in both the value 330 labeled "C" and labeled "D" is identified by use of the logical AND function.

Finally, having identified the rightmost bit 309 position at which the values 330 labeled "A" and "B" differ and storing that bit 309 position in the value labeled "E," the present embodiment determines whether that bit 309 position is greater in the bit reversal value 335 of "A" or "B," as shown in element 410. Since only "1" and "0" are allowed in a binary number system, the bit 309 must be a "1" in the value 330 labeled "B" and a "0" in the value 330 labeled "A" if the bit reversal value 335 of "B" is larger than the bit reversal value 335 of "A. Therefore, the present embodiment determines the logical "AND" operation of the values 330 labeled "B" and "E" and if result is nonzero then the rightmost position at which the values 330 labeled "A" and "B" differ is not "0." Thus, the bit reversal value 335 of "B" is greater than the bit reversal value 335 of "A." Determining whether the bit reversal value 335 of "A" is greater than the bit reverse value 335 of "B" may be accomplished by altering the operation as described with regard to element 410 as follows. Perform the "AND" operation on the value 330 labeled "E" and the value 330 labeled "A" and if the result is not zero than the bit reversal value 335 of "A" is greater than the bit reversal value 335 of "B."

It will be appreciated that the value 330 labeled "A" may be represented as a first value herein. The value 330 labeled "B" may be represented as a second value herein. The value 330 labeled "C" may be represented as a third value herein. The value 330 labeled "D" may be represented as a fourth value herein. The value 330 labeled "E" may be represented as a fifth value herein, and so on.

By means of example and as described in element 404, if the value 330 labeled "A=1,001,001" and the value 330 labeled "B=1,011,111," then the "XOR" operation results in the value 330 labeled "C=0,010,110." Then as described in element 406, negating the value 330 labeled "C" results in the value 330 labeled "D=1,101,010." Now as described in element 408, performing the "AND" operation on the values 330 labeled "C" and "D" results in the value 330 labeled "E=0,000,010." Finally, as described in element 410, performing the "AND" operation on the values 330 labeled "E" and "B" results in the value 330 of "0,000,010" which is not zero. Therefore the bit reversal value 335 of "B" is greater than the bit reversal value 335 of "A."

Figure 4C:
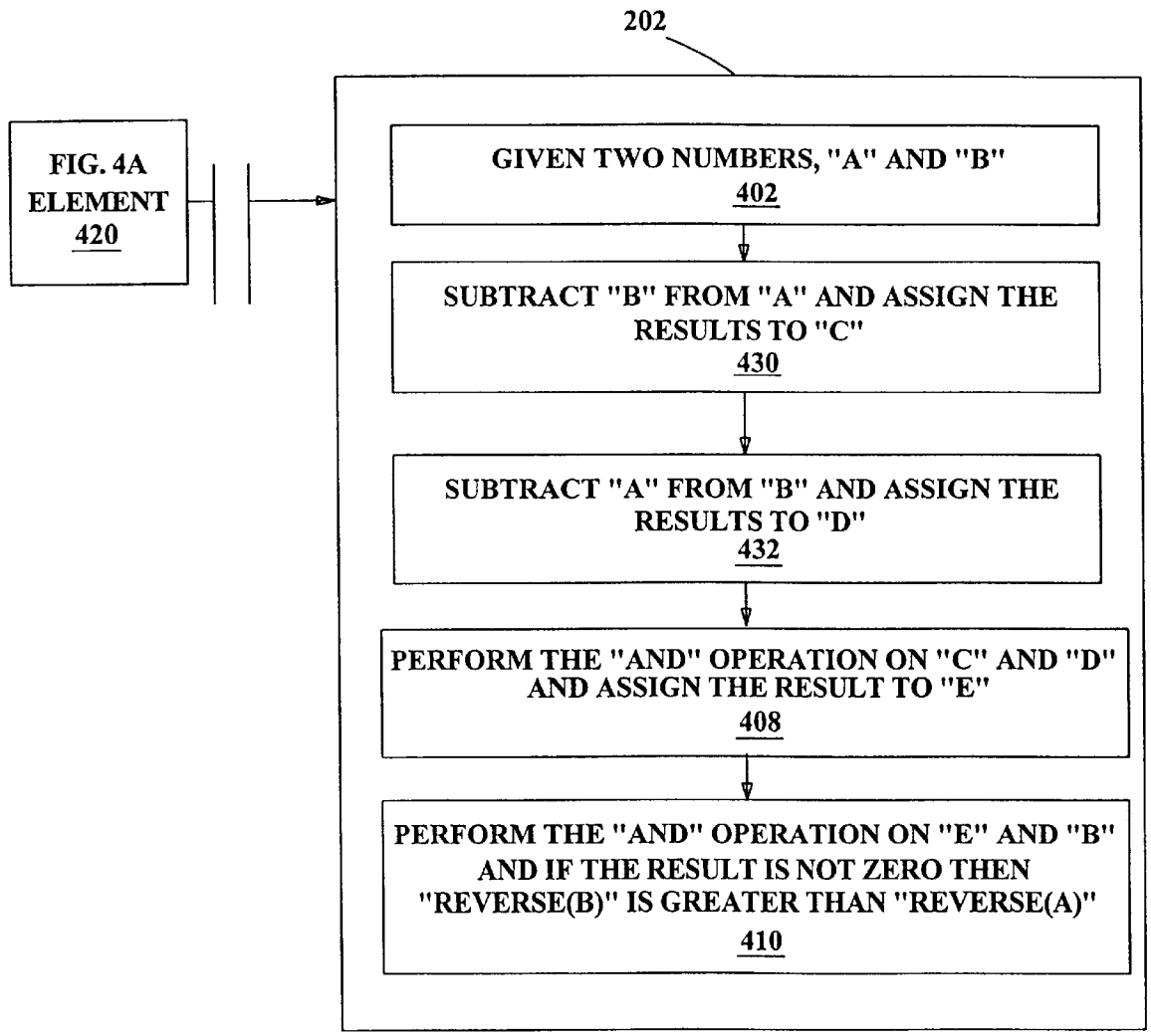
FIG. 4C is a flow diagram that illustrates an alternative embodiment of the bit reversal operation of the present invention.

FIG. 4C is a flow diagram that illustrates an alternative embodiment of the bit reversal operation of the tree balancing module 202 and is invoked from element 420 as described with reference to FIG. 4A. The present embodiment novelly determines the greater value of two bit reversal values 335. Therefore, two values 330, here labeled "A" and "B," are compared as shown in element 402. When the operation of the tree balancing module 202 results in a non-zero number, the bit reversal value 335 of "B" is determined to be greater than the bit reversal value 335 of "A." Therefore, the node 322 associated with the value 330 labeled "B" is correspondingly inserted in the tree 302 in order with respect to the other nodes 322 in the tree 302. Thereby the present embodiment novelly determines a location for a node 322 that results in a balanced tree 302 more efficiently than in the past. It will be appreciated that the operation of the present embodiment may also compare the value 330 labeled "B" to the value 330 labeled "A," in which case if the result of the operation of the tree balancing module 202 is not zero then the bit reversal value 335 of "A" is greater than the bit reversal value 335 of "B."

Using the operation described in line 5 of Table 2, the equivalent of the exclusive or operation typically referred to as "XOR" as shown in line 4 of Table 1, is performed on each bit 309 position of the values 330 labeled "A" and "B."

That is, since the "XOR" operation on the rightmost bits 309 as shown in line 5 of Table 1 is used to indicate the rightmost bit 309 position that is different, the subtraction operation may novelly be used as an alternative. For example, consider the following bit value 309 labeled "A=110" and the bit value 309 labeled "B=010." The subtraction of the bit value 309 labeled "B" from the bit value 309 labeled "A" yields the following result: "100." By means of comparison, the result of the "XOR" operation on the values 330 labeled "A" and "B" is: "100." Therefore, the rightmost bit 309 containing "1" resulting from the operation of subtraction is equivalent to the rightmost bit containing a "1" resulting from the operation of "XOR" and indicates the rightmost differing bit 309.

Therefore as shown in element 430 the value 330 labeled "B" is subtracted from the value 330 labeled "A" and the results are assigned to the value 330 labeled "C," which is the equivalent of the expression "A XOR B" as shown in element 404 of FIG. 4B for the purpose of determining the rightmost differing bit 309. To determine the rightmost bit 309 position of the value 330 labeled "C" that has a non-zero bit, the negation of the value 330 labeled "C" is determined and assigned to the value labeled "D" (D=-C), as shown in element 432. Therefore, continuing to show equivalence between the presently described alternative operation and the operation of bit reversal as shown in FIG. 4B, the negation of the value 330 labeled "C" as shown in element 406 of FIG. 4B is equivalent to the operation shown in element 432. That is reversing the order of subtraction as shown in element 432 negates the value 330 labeled "C." Therefore the value 330 labeled "A" is subtracted from the value 330 labeled "B" and the results are assigned to the value 330 labeled "D," as shown in element 432.

Then the present alternative embodiment proceeds similarly to the operation described with reference to FIG. 4B. Therefore, the logical "AND" operation is performed on the value 330 labeled "D" and the value 330 labeled "C" and the result is assigned to the value labeled "E" (E=D AND C), as shown in element 408. Recall that the value 330 labeled "E" will have only the rightmost nonzero bit 309 in C set to "1" and all other bits 309 will be "0." Therefore, as shown in element 408 the single bit 309 position that is "1" in both the value 330 labeled "C" and labeled "D" is identified by use of the logical AND operation. Finally, having identified the rightmost bit 309 position at which the values 330 labeled "A" and "B" differ and storing that bit 309 position in the value 330 labeled "E," the present embodiment determines whether that bit 309 position is greater in the bit reversal value 335 of "A" or "B," as shown in element 410. Therefore, the present embodiment determines the logical "AND" operation of the values 330 labeled "B" and "E" and if result is nonzero then the rightmost position at which the values 330 labeled "A" and "B" differ is not "0." Thus, the bit reversal value 335 of "B"is greater than the bit reversal value 33 of "A."

Figure 5:
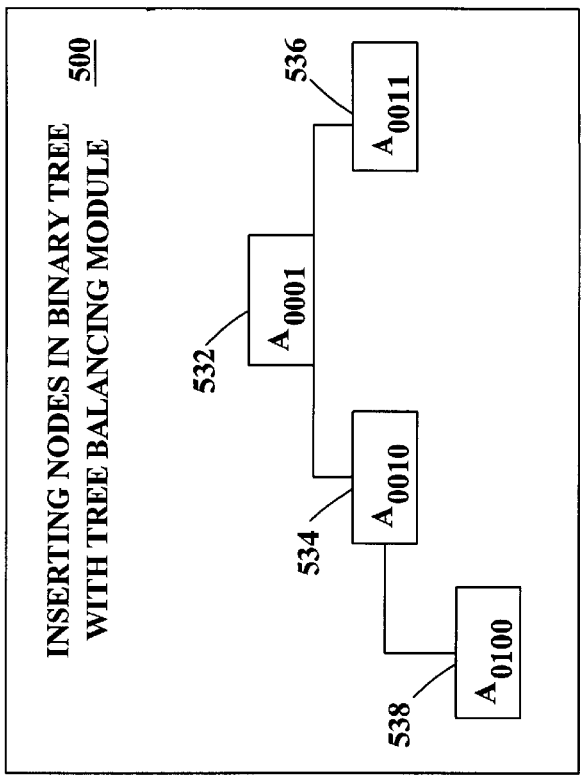
FIG. 5 is a block diagram that is an example of the insertion of nodes in a tree by the tree balancing module.
Figure 5:
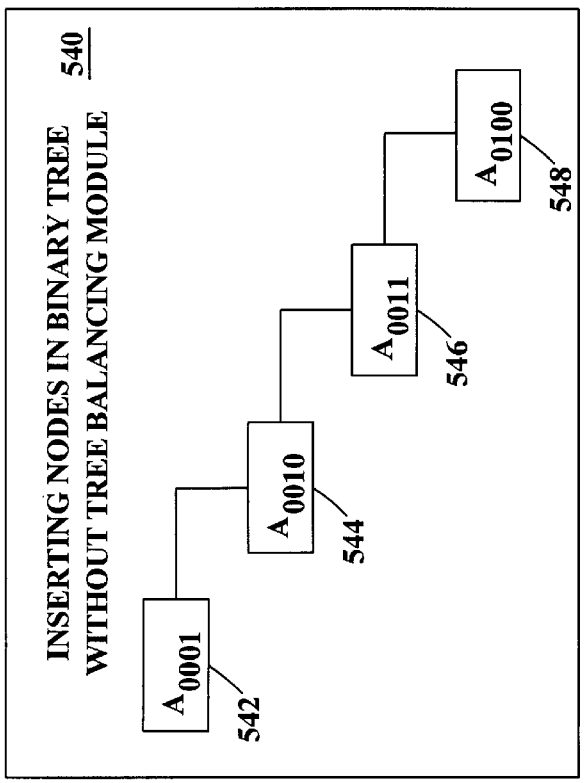
Figure 5:
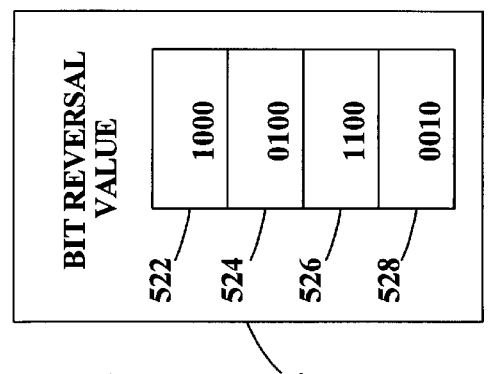
Figure 5:
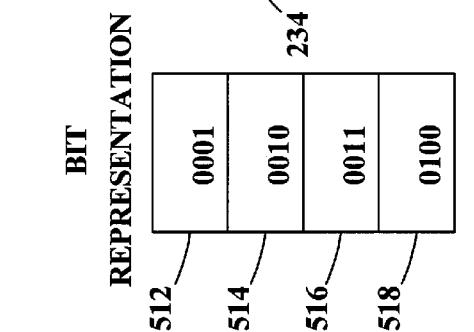
Figure 5:
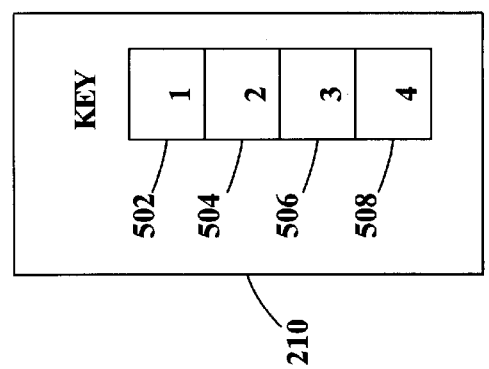

FIG. 5 is a block diagram that illustrates the insertion of nodes 322 in a tree 302 by the operation of the present embodiment, as shown in element 500. More particularly, the present example shows the operation of the tree balancing module 202 when the values 330 associated with the nodes 322 are equal. Further, the tree 302 also has a second set of values 330 associated with the nodes 322 that are identified as keys 310, that may be the address of the nodes 322, and that progress in a patterned order. The node 322, the tree 302, the tree balancing module 202, and the values 330 are shown in FIG. 3.

Therefore the present example includes four keys 310 that are associated with four nodes 322. More particularly, the key 310 labeled "1" as shown in element 502 is associated with the node 322 labeled "A" as shown in element 532. The key 310 labeled "2" as shown in element 504 is associated with the node 322 labeled "A" as shown in element 534. The key 310 labeled "3" as shown in element 506 is associated with the node 322 labeled "A" as shown in element 536. Finally, the key 310 labeled "4" as shown in element 508 is associated with the node 322 labeled "A" as shown in element 538.

It will be appreciated that the values 330 associated with the keys 310 progress in a sequentially patterned order, and the values 330 associated with the nodes are equal, here represented by "A." The present embodiment improves balance of the tree 302 over operations of the past. More particularly, the tree balancing module 202 uses the bit reversal operation to assign a location for the nodes 322 that are associated with keys 310 that progress in sequential order thereby balancing the tree 302 that would otherwise be degenerate.

By means of illustration, the insertion of nodes 322 in a tree 302 without the operation of the tree balancing module 202 is shown in element 540. The key 310 with the bit value 309 "0001" as shown in element 542 is associated with the root node 328. The next node 322 associated with a key 310 with the bit value 309 "0010" is located to the right of the node 322 associated with the key 310 with the binary label "0001" as shown in element 544. Similarly the node 322 associated with the key 310 with the bit value 309 "0011" is located to the right of its parent node 326 as shown in element 546. Finally, the node 322 associated with the key 310 with the bit value 309 "0100" is located to the right of its parent node 326 as shown in element 548. The resulting tree 302 is a degenerate tree 302.

Returning to element 420 of FIG. 4A, the tree balancing module 202 compares the new node 322 to the current node 322 to determine the appropriate position for insertion of the new node 322 into the tree 302. The present embodiment may use the bit 309 representation of the key 310. Alternatively the present embodiment may use the bit 309 representation of any value 330 associated with the nodes 322 of the tree 302. Also, the present embodiment uses the bit reversal order value 334 to determine the appropriate location of each node 322 in the tree 302.

Therefore, by means of example, as shown in element 502 of FIG. 5, a key 310 labeled "1" has a bit 309 representation of "0001" as shown in element 512. Also the associated bit reversal value 335 for the key 310 labeled "1" is "1000" as shown in element 522. It will be appreciated that the decimal value of the bit reversal value 335 as shown in element 522 is "8." Therefore the node shown in element 532 is represented by "$A_{0001}$" where "A" is the value 330 associated with the node 322, "0001" is the bit value 309 of the key 310 associated with the node 322, and "1000" is the bit reversal value 335 associated with the key 310.

Continuing, as shown in element 504 of FIG. 5, a key 310 labeled "2" has a bit 309 representation of "0010" as shown in element 514. Also the associated bit reversal value 335 for the key 310 labeled "2" is "0100" as shown in element 524. It will be appreciated that the decimal value of the bit reversal value 335 as shown in element 524 is "4." Therefore the node shown in element 534 is represented by "$A_{0010}$" where "A" is the value 330 associated with the node 322, "0010" is the bit value 309 of the key 310 associated with the node 322, and "0100" is the bit reversal value 335 associated with the key 310.

Continuing, as shown in element 506 of FIG. 5, a key 310 labeled "3" has a bit 309 representation of "0011" as shown in element 516. Also the associated bit reversal value 335 for the key 310 labeled "3" is "1100" as shown in element 526. It will be appreciated that the decimal value of the bit reversal value 335 as shown in element 526 is "12." Therefore the node shown in element 536 is represented by "$A_{0011}$" where "A" is the value 330 associated with the node 322, "0011" is the bit value 309 of the key 310 associated with the node 322, and "1100" is the bit reversal value 335 associated with the key 310.

Finally, as shown in element 508 of FIG. 5, a key 310 labeled "4" has a bit 309 representation of "0100" as shown in element 518. Also the associated bit reversal value 335 for the key 310 labeled "4" is "0010" as shown in element 528. It will be appreciated that the decimal value of the bit reversal value 335 as shown in element 526 is "2." Therefore the node shown in element 538 is represented by "$A_{0100}$" where "A" is the value 330 associated with the node 322, "0100" is the bit value 309 of the key 310 associated with the node 322, and "0010" is the bit reversal value 335 associated with the key 310.

Therefore, when the values 330 associated with the nodes 322 are equal as described with respect to element 420 of FIG. 4A, a value 330 that may represent the address 325 (as shown in FIG. 3) of the node 322 is bit reversed. The tree 302 is then ordered by the bit reversal value 335 associated with the node 322 and is more balanced than the degenerate tree 302 such as the one shown in element 540 of FIG. 5.

The value 330 may be a key 310 but is not limited to a key 310. Therefore the bit reversal value 335 may be determined by the present embodiment (as described with reference to FIG. 4B) without creating a key 310 that requires storage. Rather the bit reversal value 335 may be determined during execution on the computer system 200 (as shown in FIG. 2A) without storing the bit reversal value 335. Therefore, the present embodiment obviates the need to generate and use an additional value 330 as a key 310, reducing both time and space requirements of the computer system 200 when balancing a tree 302.

The present embodiment maybe used to balance a tree 302 when values 330 associated with nodes 322 of the tree 302 are equal or when the values 330 associated with nodes 330 progress in a patterned order. The present embodiment may operate to associate a bit reversal value 335 with each node 322 of a Binary Tree 304 and thereby balance the Binary Tree 304 by creating a balanced Cartesian Tree 306 (as are shown in FIG. 3). Alternatively, the present embodiment may balance a tree 302 by associating a bit reversal value 325 with each node 322. The bit reversal value 335 may be associated with the address 235 (as shown in FIG. 3) of each node 322 or with a value 330 associated with each node 322. Since, the present embodiment may be used on a secondary key 310 that may be associated with a tree 302 such as a Cartesian Tree 306, the present embodiment enables the efficient use of a computer-based tree 302 such as a Cartesian Tree 306 with the properties of a heap or with properties of a treap.

Alternative Embodiments

The foregoing description, for purposes of explanation, used specific nomenclature to provide a thorough understanding of the invention. However, it will be apparent to one skilled in the art that the specific details are not required in order to practice the invention. In other instances, well known devices are shown in block diagram form in order to avoid unnecessary distraction from the underlying invention. Thus, the foregoing descriptions of specific embodiments of the tree balancing module are presented for purposes of illustration and description. They are not intended to be exhaustive or to limit the invention to the precise forms disclosed, many modifications and variations are possible in view of the above teachings. Those skilled in the art will recognize that changes may be made in form and detail without departing from the scope of the invention. The invention is limited only by the claims.

What is claimed is:

1. A computer implemented method for efficiently ordering at least two computer-based values, said computer having computer readable medium encoded in a source program that executes on said computer, and said computer supporting two's complement execution of said source program, a logical XOR operation, and a logical AND operation, said method comprising:

identifying a first said value in said source program;

identifying a second said value in said source program;

assigning a result of executing logical XOR on said first value and said second value to a third said value;

assigning a result of executing negation of said third value to a fourth said value;

assigning a result of executing logical AND on said third value and said fourth value to a fifth said value; and assigning a result of executing logical AND on said fifth value and said second value to a bit reversal order value and if said bit reversal order value is not zero then reverse of said second value is greater than reverse of said first value thereby efficiently ordering said first value and said second value.

2. The computer implemented method as set forth in claim 1, said source program having a tree-based data structure, further comprising:

identifying a binary said tree-based data structure having at least two nodes and each said node being associated with a key;

associating said first value with a first said node;

associating said second value with a second said node;

associating a first primary key with said first node;

associating a second primary key with said second node; and using said bit reversal order value to order said first value and said second value when said first primary key is equivalent to said second primary key so that said first node and said second node are ordered in said binary tree-based data structure thereby efficiently ordering said nodes in said binary tree-based data structure.

3. The computer implemented method as set forth in claim 1, said source program having a tree-based data structure, further comprising:

identifying a Cartesian said tree-based data structure having at least two nodes and each said node being associated with a key;
associating said first value with a first said node;
associating said second value with a second said node;
associating a first heap-based secondary key with said first node;
associating a second heap-based secondary key with said second node; and
using said bit reversal order value to order said first value and said second value when said first heap-based secondary key is equivalent to said second heap-based secondary key so that said first node and said second node are ordered in said Cartesian tree-based data structure thereby efficiently ordering said nodes in said Cartesian tree-based data structure.

4. The computer implemented method as set forth in claim 1, said source program having a tree-based data structure, further comprising:
identifying a Cartesian said tree-based data structure having at least two nodes and each said node being associated with a key;
associating said first value with a first said node and said first value being a first heap-based secondary key associated with said first node;
associating said second value with a second said node and said second value being a second heap-based secondary key associated with said second node; and
using said bit reversal order value on said first value and said second value so that said first node and said second node are ordered in said Cartesian tree-based data structure thereby efficiently ordering said nodes in said Cartesian tree-based data structure.

5. A computer implemented method for efficiently ordering at least two computer-based values, said computer having computer readable medium encoded in a source program that executes on said computer, and said computer supporting two's complement execution of said source program, a subtraction operation, and a logical AND operation, said method comprising:
identifying a first said value in said source program;
identifying a second said in said source program;
assigning a result of subtracting said second value from said first value to a third said value;
assigning a result of subtracting said first value from said second value to a fourth said value;
assigning a result of executing logical AND on said third value and said fourth value to a fifth said value; and
assigning a result of executing logical AND on said fifth value and said second value to a bit reversal order value and if said bit reversal order value is not zero then reverse of said second value is greater than reverse of said first value thereby efficiently ordering said first value and said second value.

6. The computer implemented method as set forth in claim 5, said source program having a tree-based data structure, further comprising:
identifying a binary said tree-based data structure having at least two nodes and each said node being associated with a key;
associating said first value with a first said node;
associating said second value with a second said node;
associating a first primary key with said first node;
associating a second primary key with said second node; and
using said bit reversal order value to order said first value and said second value when said first primary key is equivalent to said second primary key so that said first node and said second node are ordered in said binary tree-based data structure thereby efficiently ordering said nodes in said binary tree-based data structure.

7. The computer implemented method as set forth in claim 5, said source program having a tree-based data structure, further comprising:
identifying a Cartesian said tree-based data structure having at least two nodes and each said node being associated with a key;
associating said first value with a first said node;
associating said second value with a second said node;
associating a first heap-based secondary key with said first node;
associating a second heap-based secondary key with said second node; and
using said bit reversal order value to order said first value and said second value when said first heap-based secondary key is equivalent to said second heap-based secondary key so that said first node and said second node are ordered in said Cartesian tree-based data structure thereby efficiently ordering said nodes in said Cartesian tree-based data structure.

8. The computer implemented method as set forth in claim 5, said source program having a tree-based data structure, further comprising:
identifying a Cartesian said tree-based data structure having at least two nodes and each said node being associated with a key;
associating said first value with a first said node and said first value being a first heap-based secondary key associated with said first node;
associating said second value with a second said node and said second value being a second heap-based secondary key associated with said second node; and
using said bit reversal order value on said first value and said second value so that said first node and said second node are ordered in said Cartesian tree-based data structure thereby efficiently ordering said nodes in said Cartesian tree-based data structure.

9. A computer apparatus for efficiently ordering at least two computer-based values, said computer having computer readable medium encoded in a source program that executes on said computer, and said computer supporting two's complement execution of said source program, a logical XOR operation, and a logical AND operation, said apparatus comprising:
a first said value in said source program;
a second said value in said source program;
a third said value resulting from executing logical XOR on said first value and said second value;
a fourth said value resulting from executing negation of said third value;
a fifth said value resulting from executing logical AND on said third value and said fourth value; and
a bit reversal order value resulting from executing logical AND on said fifth value and said second value and if said bit reversal order value is not zero then reverse of said second value is greater than reverse of said first value thereby efficiently ordering said first value and said second value.

10. A computer apparatus for efficiently ordering at least two computer-based values, said computer having computer readable medium encoded in a source program that executes on said computer, and said computer supporting two's complement execution of said source program, a subtraction operation, and a logical AND operation, said method comprising:

a first said value in said source program;

a second said value in said source program;

a third said value resulting from subtracting said second value from said first value;

a fourth said value resulting from subtracting said first value from said second value;

a fifth said value resulting from executing logical AND on said third value and said fourth value; and a bit reversal order value resulting from executing logical AND on said fifth value and said second value and if said bit reversal order value is not zero then reverse of said second value is greater than reverse of said first value thereby efficiently ordering said first value and said second value.

11. An article of manufacture comprising a program storage medium having computer readable program code embodied therein for efficiently ordering at least two computer-based values, and said computer supporting two's complement execution of said program code, a logical XOR operation, and a logical AND operation, said article of manufacture comprising:

computer readable program code for identifying a first said value in said program code;

computer readable program code for identifying a second said value in said program code;

computer readable program code for assigning a result of executing logical XOR on said first value and said second value to a third said value;

computer readable program code for assigning a result of executing negation of said third value to a fourth said value;

computer readable program code for assigning a result of executing logical AND on said third value and said fourth value to a fifth said value; and computer readable program code for assigning a result of executing logical AND on said fifth value and said second value to a bit reversal order value and if said bit reversal order value is not zero then reverse of said second value is greater than reverse of said first value thereby efficiently ordering said first value and said second value.

12. The article of manufacture as set forth in claim 11, said program code having a tree-based data structure, further comprising:

computer readable program code for identifying a binary said tree-based data structure having at least two nodes and each said node being associated with a key;

computer readable program code for associating said first value with a first said node;

computer readable program code for associating said second value with a second said node;

computer readable program code for associating a first primary key with said first node;

computer readable program code for associating a second primary key with said second node; and computer readable program code for using said bit reversal order value to order said first value and said second value when said first primary key is equivalent to said second primary key so that said first node and said second node are ordered in said binary tree-based data structure thereby efficiently ordering said nodes in said binary tree-based data structure.

13. The article of manufacture as set forth in claim 11, said program code having a tree-based data structure, further comprising:

computer readable program code for identifying a Cartesian said tree-based data structure having at least two nodes and each said node being associated with a key;

computer readable program code for associating said first value with a first said node;

computer readable program code for associating said second value with a second said node;

computer readable program code for associating a first heap-based secondary key with said first node;

computer readable program code for associating a second heap-based secondary key with said second node; and computer readable program code for using said bit reversal order value to order said first value and said second value when said first heap-based secondary key is equivalent to said second heap-based secondary key so that said first node and said second node are ordered in said Cartesian tree-based data structure thereby efficiently ordering said nodes in said Cartesian tree-based data structure.

14. The article of manufacture as set forth in claim 11, said program code having a tree-based data structure, further comprising:

computer readable program code for identifying a Cartesian said tree-based data structure having at least two nodes and each said node being associated with a key;

computer readable program code for associating said first value with a first said node and said first value being a first heap-based secondary key associated with said first node;

computer readable program code for associating said second value with a second said node and said second value being a second heap-based secondary key associated with said second node; and computer readable program code for using said bit reversal order value on said first value and said second value so that said first node and said second node are ordered in said Cartesian tree-based data structure thereby efficiently ordering said nodes in said Cartesian tree-based data structure.

15. An article of manufacture comprising a program storage medium having computer readable program code embodied therein for efficiently ordering at least two computer-based values, said computer supporting two's complement execution of said program code, a subtraction operation, and a logical AND operation, said article of manufacture comprising:

computer readable program code for identifying a first said value in said program code;

computer readable program code for identifying a second said in said program code;

computer readable program code for assigning a result of subtracting said second value from said first value to a third said value;

computer readable program code for assigning a result of subtracting said first value from said second value to a fourth said value;

computer readable program code for assigning a result of executing logical AND on said third value and said fourth value to a fifth said value; and computer readable program code for assigning a result of executing logical AND on said fifth value and said second value to a bit reversal order value and if said bit reversal order value is not zero then reverse of said second value is greater than reverse of said first value thereby efficiently ordering said first value and said second value.

16. The article of manufacture as set forth in claim 15, said program code having a tree-based data structure, further comprising:

computer readable program code for identifying a binary said tree-based data structure having at least two nodes and each said node being associated with a key;

computer readable program code for associating said first value with a first said node;

computer readable program code for associating said second value with a second said node;

computer readable program code for associating a first primary key with said first node;

computer readable program code for associating a second primary key with said second node; and computer readable program code for using said bit reversal order value to order said first value and said second value when said first primary key is equivalent to said second primary key so that said first node and said second node are ordered in said binary tree-based data structure thereby efficiently ordering said nodes in said binary tree-based data structure.

17. The article of manufacture as set forth in claim 15, said program code having a tree-based data structure, further comprising:

computer readable program code for identifying a Cartesian said tree-based data structure having at least two nodes and each said node being associated with a key;

computer readable program code for associating said first value with a first said node;

computer readable program code for associating said second value with a second said node;

computer readable program code for associating a first heap-based secondary key with said first node;

computer readable program code for associating a second heap-based secondary key with said second node; and computer readable program code for using said bit reversal order value to order said first value and said second value when said first heap-based secondary key is equivalent to said second heap-based secondary key so that said first node and said second node are ordered in said Cartesian tree-based data structure thereby efficiently ordering said nodes in said Cartesian tree-based data structure.

18. The article of manufacture as set forth in claim 15, said program code having a tree-based data structure, further comprising:

computer readable program code for identifying a Cartesian said tree-based data structure having at least two nodes and each said node being associated with a key;

computer readable program code for associating said first value with a first said node and said first value being a first heap-based secondary key associated with said first node;

computer readable program code for associating said second value with a second said node and said second value being a second heap-based secondary key associated with said second node; and computer readable program code for using said bit reversal order value on said first value and said second value so that said first node and said second node are ordered in said Cartesian tree-based data structure thereby efficiently ordering said nodes in said Cartesian tree-based data structure.

19. A computer readable memory device encoded with a data structure having entries for efficiently ordering at least two computer-based value entries and a source program entry that executes on said computer, and said computer supporting two's complement execution of said source program entry, a logical XOR operation, and a logical AND operation, said memory device comprising:

a first said value entry in said source program entry;

a second said value entry in said source program entry;

a third said value entry resulting from executing logical XOR on said first value entry and said second value entry;

a fourth said value entry resulting from executing negation of said third value entry;

a fifth said value entry resulting from executing logical AND on said third value entry and said fourth value entry; and a bit reversal order value entry resulting from executing logical AND on said fifth value entry and said second value entry and if said bit reversal order value entry is not zero then reverse of said second value entry is greater than reverse of said first value entry thereby efficiently ordering said first value entry and said second value entry.

20. A computer readable memory device encoded with a data structure having entries for efficiently ordering at least two computer-based value entries and a source program entry that executes on said computer, and said computer supporting two's complement execution of said source program entry, a subtraction operation, and a logical AND operation, said memory device comprising:

a first said value entry in said source program entry;

a second said value in said source program entry;

a third said value entry resulting from subtracting said second value entry from said first value entry;

a fourth said value entry resulting from subtracting said first value entry from said second value entry;

a fifth said value entry resulting from executing logical AND on said third value entry and said fourth value entry; and a bit reversal order value entry resulting from executing logical AND on said fifth value entry and said second value entry and if said bit reversal order value entry is not zero then reverse of said second value entry is greater than reverse of said first value entry thereby efficiently ordering said first value entry and said second value entry.

* * * * *